(12) United States Patent
Magnusson et al.

(10) Patent No.: US 9,791,623 B2
(45) Date of Patent: Oct. 17, 2017

(54) MULTILEVEL LEAKY-MODE RESONANT OPTICAL DEVICES

(75) Inventors: Robert Magnusson, Arlington, TX (US); Mehrdad Shokooh-Saremi, Plano, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1746 days.

(21) Appl. No.: 12/957,319

(22) Filed: Nov. 30, 2010

(65) Prior Publication Data
US 2011/0156987 A1    Jun. 30, 2011

Related U.S. Application Data

(60) Provisional application No. 61/264,879, filed on Nov. 30, 2009.

(51) Int. Cl.
| | |
|---|---|
| G02B 6/126 | (2006.01) |
| G02B 5/08 | (2006.01) |
| G02B 5/20 | (2006.01) |
| G02B 5/28 | (2006.01) |
| G02B 5/18 | (2006.01) |
| G02B 6/124 | (2006.01) |
| G02B 5/30 | (2006.01) |
| G02B 6/14 | (2006.01) |
| G02B 6/12 | (2006.01) |

(52) U.S. Cl.
CPC .......... *G02B 6/126* (2013.01); *G02B 5/0833* (2013.01); *G02B 5/1823* (2013.01); *G02B 5/203* (2013.01); *G02B 5/285* (2013.01); *G02B 5/288* (2013.01); *G02B 5/3041* (2013.01); *G02B 6/124* (2013.01); *G02B 6/14* (2013.01); *G02B 2006/12038* (2013.01); *G02B 2006/12061* (2013.01)

(58) Field of Classification Search
CPC .... G02B 5/0833; G02B 5/1823; G02B 5/203; G02B 5/285; G02B 5/288; G02B 6/124; G02B 6/126; G02B 5/3041; G02B 6/14; G02B 2006/12061; G02B 2006/12038
USPC ............................................. 359/485.01, 298
See application file for complete search history.

(56) References Cited

U.S. PATENT DOCUMENTS

| | | | |
|---|---|---|---|
| 5,216,680 A | 6/1993 | Magnusson et al. | 372/20 |
| 5,598,300 A | 1/1997 | Magnusson et al. | 359/566 |
| 5,675,691 A * | 10/1997 | Edlinger et al. | 385/130 |
| 5,978,524 A | 11/1999 | Bischel et al. | 385/4 |
| 6,154,480 A | 11/2000 | Magnusson et al. | 372/96 |
| 6,268,953 B1 * | 7/2001 | Maloney | 359/321 |
| 7,071,417 B2 * | 7/2006 | Clare et al. | 174/122 G |

(Continued)

OTHER PUBLICATIONS

Brundrett, et al., "Effects of modulation strength in guided-mode resonant subwavelength gratings at normal incidence," *J. Opt. Soc. Am. A.*, 17:1221-30, 2000.

(Continued)

*Primary Examiner* — Howard Williams
(74) *Attorney, Agent, or Firm* — Norton Rose Fulbright US LLP

(57) ABSTRACT

Multilevel leaky-mode optical elements, including reflectors, polarizers, and beamsplitters. Some of the elements have a plurality of spatially modulated periodic layers coupled to a substrate. For infrared applications, the optical elements may have a bandwidth larger than 600 nanometers.

10 Claims, 34 Drawing Sheets

(56) References Cited

U.S. PATENT DOCUMENTS

| | | | | |
|---|---|---|---|---|
| 7,548,671 | B2* | 6/2009 | Wu | G02B 6/12007 372/10 |
| 7,689,086 | B2* | 3/2010 | Magnusson | G02B 6/124 385/129 |
| 7,768,640 | B2* | 8/2010 | Cunningham | G01N 21/6428 356/317 |
| 7,858,921 | B2* | 12/2010 | Stanton | H01L 27/14629 250/226 |
| 8,098,430 | B2* | 1/2012 | Iizuka | G02B 5/1809 359/489.06 |
| 8,111,401 | B2* | 2/2012 | Magnusson | G01N 21/253 356/480 |
| 2009/0067774 | A1 | 3/2009 | Magnusson | 385/10 |
| 2010/0092124 | A1 | 4/2010 | Magnusson | 385/11 |

OTHER PUBLICATIONS

Brundrett, et al., "Homogeneous layer models for high-spatial-frequency dielectric surface-relief gratings: conical diffraction and antireflection designs," *Appl. Opt.*, 33:2695-2706, 1994.
Ciosek, et al., "Design and manufacture of all dielectric nonpolarizing beam splitters," *Appl. Opt.*, 38:1244-50, 1999.
Day, et al., "Filter response lineshapes of resonant waveguide gratings," *J. Lightwave Tech.*, 14:1815-24, 1996.
de Sterke, et al., "Nonpolarizing beam splitter design," *Appl. Opt.*, 22: 595-601, 1983.
Ding and Magnusson, "Doubly resonant single-layer bandpass optical filters," *Opt. Lett.*, 29:1135-7, 2004.
Ding and Magnusson, "Resonant leaky-mode spectral-band engineering and device applications," *Opt. Express*, 12:5661-74, 2004.
Ding, et al., "Polarization independent resonant bandstop filters using 1D periodic layers with asymmetric profiles," Diffractive Optics and Micro Optics Topical Meeting, DOMO 2004, Rochester, NY, Oct. 10-14, 2004.
Ding and Magnusson, "Use of nondegenerate resonant leaky modes to fashion diverse optical spectra," *Optics Express*, 12:1885-91, 2004.
Fehrembach and Sentenac, "Unpolarized narrow-band filtering with resonant gratings," *Appl. Phys. Lett.*, 86:121, 2005.
Fu, et al., "Nonpolarizing guided-mode resonance filter," *Opt. Lett.*, 34:124-6, 2009.
Gaylord, et al, "Analysis and applications of optical diffraction by gratings" *Proc. IEEE*, 73:894-937, 1985.
Gilo, "Design of a nonpolarizing beam splitter inside a glass cube," *Appl. Opt.*, 31:5345-9, 1992.
Golubenko, et al., "Total reflection of light from a corrugated surface of a dielectric waveguide," *Sov. J. Quantum Electron*, 15:886-7, 1985.
Grinvald, et al., "Role of photonic bandgaps in polarization-independent grating waveguide structures," *J Opt. Soc. Am. A. Opt. Image Sci.*, 25:1435-43, 2008.
Kennedy and Eberhart, "Particle swarm optimization," *Neural Networks*, 4:1942-8, 1995.
Lee, et al., "Sillicon-layer guided-mode resonance polarizer with 40-nm bandwidth," *IEEE Photon. Technol. Lett.*, 20:1857-9, 2008.
Lemarchand, et al., "Increasing the angular tolerance of resonant grating filters with doubly periodic structures," *Opt. Lett.*, 23:1149-51, 1998.
Liu, et al., "Concept of multiorder multimode resonant optical filters," *IEEE Photonics Tech. Lett.*, 14:1091-3, 2002.
Magnusson and Shin, "Diffractive optical components," *Encyclopedia of Physical Science and Technology*, 4:421-40, 2002.
Magnusson and Shokooh-Saremi, "Physical basis for wideband resonant reflectors," *Opt. Express*, 3456-62, 2008.
Magnusson and Shokooh-Saremi, "Widely tunable guided-mode resonance nanoelectromechanical RGB pixels," *Opt. Express*, 15:109093-10, 2007.
Magnusson, et al., "New principle for optical filters," *Appl. Phys. Lett.*, 61:1022, 1992.

Magnusson, et al., "Photonic devices enabled by waveguide-mode resonance effects in periodically modulated films," *Proc. SPIE*, 5225, 20, 2003.
Magnusson, et al., "Spectral-band engineering with interacting resonant leaky mode in thin periodic films," *Proc. SPIE*, 5720:119-129, 2005.
Magnusson, et al., "Transmission bandpass guided-mode resonance filters," *Applied Optics*, 34:8106-9, 1995.
Mashev and Popov, "Zero order anomaly of dielectric coated gratings," *Opt. Commun.*, 55:377-80, 1985.
Mateus, et al., "Broad-band mirror (1.12-1.62 μm) using a subwavelength grating," *IEEE Photon. Technol. Lett.*, 16:1676-8, 2004.
Mateus, et al., "Ultrabroadband mirror using low-index cladded subwavelength grating," *IEEE Photon. Technol. Lett.*, 16:518-20, 2004.
Mitzutani, et al., "Nonpolarizing guided-mode resonant grating filter for oblique incidence," *J. Opt. Image Sci.*, 18:1261-6, 2001.
Moharam, et al., "Stable implementation of the rigorous coupled-wave analysis for surface-relief gratings: enhanced transmittance matrix approach," *J. Opt. Soc. Amer. A. Opt. Image Sci.*, 12:1077-86, 1995.
Office Communication, issued in U.S. Appl. No. 11/188,452, dated Nov. 16, 2007.
Office Communication, issued in U.S. Appl. No. 11/188,452, dated Apr. 7, 2008.
Office Communication, issued in U.S. Appl. No. 11/188,452, dated Dec. 12, 2008.
Office Communication, issued in U.S. Appl. No. 11/188,452, dated Jun. 25, 2009.
Office Communication, issued in U.S. Appl. No. 12/576,764, dated Jul. 21, 2010.
Office Communication, issued in U.S. Appl. No. 12/576,764, dated Jan. 24, 2011.
Office Communication, issued in U.S. Appl. No. 12/576,764, dated Apr. 11, 2011.
Peng, et al., "Experimental demonstration of resonant anomalies in diffraction from two-dimensional gratings," *Opt. Lett.*, 21:549-51, 1996.
Peng, et al., "Theory of periodic dielectric waveguides," *IEEE Trans. Microwave Theory and Tech.*, 23:123-33, 1975.
Popov, et al., "Theoretical study of anomalies of coated dielectric gratings," *Opt. Acta*, 33:607-19, 1986.
Response to Office Communication dated Nov. 16, 2007, filed in U.S. Appl. No. 11/188,452, dated Dec. 17, 2007.
Response to Office Communication dated Apr. 7, 2008, filed in U.S. Appl. No. 11/188,452, dated Sep. 8, 2008.
Response to Office Communication dated Dec. 12, 2008, filed in U.S. Appl. No. 11/188,452, dated Apr. 13, 2009.
Response to Office Communication dated Jun. 25, 2009, filed in U.S. Appl. No. 11/188,452, dated Sep. 8, 2009.
Response to Office Communication dated Jul. 21, 2010, filed in U.S. Appl. No. 12/576,764, dated Oct. 18, 2010.
Response to Office Communication dated Jan. 24, 2011, filed in U.S. Appl. No. 12/576,764, dated Jul. 22, 2011.
Response to Office Communication dated Apr. 11, 2011, filed in U.S. Appl. No. 12/576,764, dated Apr. 25, 2011.
Robinson and Rahmat-Samil, "Particle swarm optimization in electromagnetic," *IEEE Trans. Antennas Propag.*, 52:397-407, 2004.
Rosenblatt, et al., "Resonant grating waveguide structure," *IEEE J. Quant. Electronics*, 33:2038-59, 1997.
Shokooh-Saremi and Magnusson, "Leaky-mode resonant reflectors with extreme bandwidths," *Opt. Lett.*, 35:1121-3, 2010.
Shokooh-Saremi and Magnusson, "New non-polarizing resonant beam splitters" *IEEE Photonics Journal*, 2:670-6, 2010.
Shokooh-Saremi and Magnusson, "Particle swarm optimization and its application to the design of diffraction grating filters," *Opt. Lett.*, 32:894-6, 2007.
Shokooh-Saremi and Magnusson, "Wideband leaky-mode resonance reflectors: influence of grating profile and sublayers," *Opt. Express*, 16:18249-63, 2008.
Suh, et al., "All-pass transmission or flattop reflection filters using a single photonic crystal slab," *Appl. Phys. Lett.*, 84:4905-7, 2004.

(56) References Cited

OTHER PUBLICATIONS

Tibuleac, et al., "Narrow-linewidth bandpass filters with diffractive thin-film layers," *Opt. Lett.*, 26:584, 2001.
Tibuleac, et al., "Reflection and transmission guided-mode resonance filters," *J. Opt. Soc. Am. A.*, 14:1617, 1997.
Vincent and Nevière, "Corrugated dielectric waveguides: a numerical study of the second-order stop bands," *Appl. Phys.*, 20:345-51, 1979.
Wang and Magnusson, "Theory and applications of guided-mode resonance filters," *Appl. Opt.*, 32:2606-13, 1993.
Wang, et al., "Multilayer waveguide-grating filters," *Appl. Opt.*, 34:2414-20, 1995.

* cited by examiner

MULTILEVEL LEAKY-MODE RESONANT OPTICAL DEVICES

CROSS REFERENCE TO RELATED APPLICATION

This application claims priority to U.S. Provisional Patent Application No. 61/264,879, filed Nov. 30, 2009, which is incorporated by reference in its entirety.

STATEMENT REGARDING FEDERALLY SPONSORED RESEARCH

This invention was made with government support under grant number ECCS-0925774 awarded by the National Science Foundation. The government has certain rights in the invention.

BACKGROUND

Field

This invention relates to optical devices and more particularly relates to multilevel leaky-mode resonant reflectors, polarizers, and beamsplitters.

Description of the Related Art

Multilayer thin films are widely applied to implement filters, polarizers, and reflectors for incorporation in various common optical systems. These devices are typically stacks of homogeneous layers deposited with precise thicknesses and indices of refraction and absorption. In many cases, a large number of layers, perhaps 10-100, may be needed to create the spectral, polarization, and angular attributes required for a particular application. These optical devices operate on the basis of multiple reflections between the interfaces incorporated in a layer stack. In particular, periodic quarter-wave layer systems provide classical high reflectors for bulk laser cavities as well as integrated distributed Bragg reflectors for vertical cavity lasers. Bragg reflectors yield efficient reflection across wide spectral bands [H. A. Macleod, Thin-Film Optical Filters, (McGraw-Hill, New York, 1989)]. Additionally, subwavelength periodic layers exhibit strong resonance effects that originate in quasi-guided, or leaky, waveguide modes. These compact elements yield versatile photonic spectra [E. Popov, L. 5 Mashev, and D. Maystre, "Theoretical study of anomalies of coated dielectric gratings," Opt. Acta 33, 607-619 (1986); G. A. Golubenko, A. S. Svakhin, V. A. Sychugov, and A. V. Tishchenko, "Total reflection of light from a corrugated surface of a dielectric waveguide," Soy. J. Quantum Electron. 15, 886-887 (1985); I. A. Avrutsky and V. A. Sychugov, "Reflection of a beam of finite size from a corrugated waveguide," J. Mod. Opt. 36, 1527-1539 (1989); S. S. Wang and R. Magnusson, "Theory and applications of guided-mode resonance filters," Appl. Opt. 32, 2606-2613 (1993).].

The functionality and applicability of thin films in optics and photonics technology can be complemented and enhanced by imbuing them with appropriate periodic modulation to achieve leaky-mode resonance. For example, it has been shown that a single periodic layer with one-dimensional periodicity enables narrow-line filters, polarizers, reflectors, and polarization independent elements [Y. Ding and R. Magnusson, "Resonant leaky-mode spectral-band engineering and device applications," Opt. Express 12, 5661-5674 (2004)]. Additionally, tunable filters and display pixels are feasible as discussed in R. Magnusson and Y. Ding, "MEMS tunable resonant leaky mode filters," IEEE Photonics Technol. Lett. 18, 1479-1481 (2006); R. Magnusson and M. Shokooh-Saremi, "Widely tunable guided-mode resonance nanoelectromechanical RGB pixels," Opt. Express 15, 10903-10910 (2007).

Efficient reflection of light across wide spectral bands is essential in a plethora of common photonic systems. Classic mirrors are made with evaporated metal films and dielectric multilayer stacks. These ordinary devices have been widely studied for a long time and are well understood. A new method to achieve effective wideband reflection response has recently emerged. This approach is based on leaky-mode resonance effects in single-layer, high refractive index contrast, one-dimensional (1D) and two-dimensional (2D) waveguide gratings. Briefly reviewing the relevant work and literature, the pursuit of resonant wideband response can be traced to Gale et al. [M. T. Gale, K. Knop, and R. Morf, "Zero-order diffractive microstructures for security applications," Proc. SPIE1210, 83-89 (1990).] and to Brundrett et al. [D. L. Brundrett, E. N. Glytsis, and T. K. Gaylord, "Normal-incidence guided-mode resonant grating filters: design and experimental demonstrations," Opt. Lett. 23, 700-702 (1998).] who achieved experimental full-width half-maximum (FWHM) linewidths near 100 nm albeit not for flat spectra. Applying cascaded resonance structures, Jacob et al. designed narrow-band flattop filters that exhibited lowered sidebands and steepened stopbands [D. K. Jacob, S. C. Dunn, and M. G. Moharam, "Normally incident resonant grating reflection filters for efficient narrow-band spectral filtering of finite beams," J. Opt. Soc. Am. A 18, 2109-2120 (2001).]. Alternatively, by coupling several diffraction orders into corresponding leaky modes in a two-waveguide system, Liu et al. found a widened spectral response and steep filter sidewalls generated by merged resonance peaks [Z. S. Liu and R. Magnusson, "Concept of multiorder multimode resonant optical filters," IEEE Photonics Technol. Lett. 14, 1091-1093 (2002).]. Suh et al. designed a flattop reflection filter using a 2D-patterned photonic crystal slab [W. Suh and S. Fan, "All-pass transmission or flattop reflection filters using a single photonic crystal slab," Appl. Phys. Lett. 84, 4905-4907 (2004).]. Emphasizing new modalities introduced by asymmetric profiles, Ding et al. presented single-layer elements exhibiting both narrow and wide flat-band spectra [Y. Ding and R. Magnusson, "Use of nondegenerate resonant leaky modes to fashion diverse optical spectra," Opt. Express 12, 1885-1891 (2004).]. Using a subwavelength grating with a low-index sublayer on a silicon substrate, Mateus et al. designed flattop reflectors with linewidths of several hundred nanometers operating in TM polarization [C. F. R. Mateus, M. C. Y. Huang, Y. Deng, A. R. Neureuther, and C. J. Chang-Hasnain, "Ultrabroadband minor using low-index cladding subwavelength grating," IEEE Photonics Technol. Lett. 16, 518-520 (2004).]. Subsequently, they fabricated a reflector with reflectance exceeding 98.5% over a 500 nm range and compared the response with numerical simulations [C. F. R. Mateus, M. C. Y. Huang, L. Chen, C. J. Chang-Hasnain, and Y. Suzuki, "Broad-band minor (1.12-1.62 µm) using a subwavelength grating," IEEE Photonics Technol. Lett. 16, 1676-1678 (2004).]. Ding et al. showed single-layer elements with about 600 nm flattop reflectance in both TE and TM polarization [Y. Ding and R. Magnusson, "Resonant leaky-mode spectral-band engineering and device applications," Opt. Express 12, 5661-5674 (2004).]. Most recently, Magnusson et al. provided detailed physical basis for such broadband leaky-mode reflectors by treating the simplest possible case, which was a single-layer, one-dimensionally patterned waveguide grating [R. Magnusson and M. Shokooh-Saremi, "Physical basis for wideband resonant reflectors," Opt. Express 16, 3456-3462 (2008).].

SUMMARY

The present devices include multilevel resonant elements that may contain one-dimensional periodic layers as well as two-dimensional periodic layers and mixtures of the two types. The devices may be designed using an inverse numerical design method.

Some embodiment of the present optical elements comprise a substrate; and a plurality of spatially modulated periodic layers coupled to the substrate; where the optical element has a bandwidth greater than 600 nanometers. Some embodiments of these optical elements may also include a physical cover medium overlying the plurality of spatially modulated periodic layers.

Some embodiments of the present optical elements comprise microwave elements that include a substrate; and a plurality of spatially modulated periodic layers coupled to the substrate; where the microwave element has a bandwidth greater than 1 gigahertz. Some embodiments of these microwave elements may also include a physical cover medium overlying the plurality of spatially modulated periodic layers.

Some embodiments of the present optical elements have a substrate comprising silica; a spatially modulated periodic layer coupled to the substrate, the spatially modulated periodic layer comprising silicon and silica; a homogeneous layer coupled to the spatially modulated period layer; and a second spatially modulated periodic layer comprising silicon disposed over the homogeneous layer; where the optical element has a period and is configured to exhibit the guided-mode resonance effect for incident light have a wavelength less than the period. Some embodiments of these optical elements may also include a physical cover medium overlying the second spatially modulated periodic layer.

Some embodiments of the present devices comprise polarizers that include a substrate; and a plurality of spatially modulated periodic layers coupled to the substrate; where the polarizer has a reflectance bandwidth equal to or greater than 100 nanometers in one of a TM polarization and a TE polarization of an incident wave, and a transmission bandwidth equal to or greater than 100 nanometers in the other of the TM polarization and the TE polarization of the incident wave. Some embodiments of these polarizers may also include a physical cover medium overlying the plurality of spatially modulated periodic layers.

Some embodiments of the present methods include fabricating a multilevel leaky-mode resonant optical element using, in part, a single-step deposition of silicon on a substrate, where the optical element has a period and is configured to exhibit the guided-mode resonance effect for incident light have a wavelength less than the period.

The term "coupled" is defined as connected, although not necessarily directly, and not necessarily mechanically.

The terms "a" and "an" are defined as one or more unless this disclosure explicitly requires otherwise.

The term "substantially" and its variations (including "about" and "approximately") are defined as being largely but not necessarily wholly what is specified as understood by one of ordinary skill in the art. In any embodiment of the present devices, the term "substantially" (or its variation) may be substituted with "within [a percentage] of" what is specified, where the percentage includes 1, 5, 10, and/or 15 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Any embodiment of any of the present devices and methods can consist of or consist essentially of—rather than comprise/include/contain/have—any of the described elements/steps and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DETAILED DESCRIPTION

New optical devices based on resonant leaky modes in periodically modulated films are provided by the present disclosure, along with inverse numerical methods for their design. The example devices discussed below, including those in the Examples, have been designed and the accompanying discussion relates to their designed features and planned operation. The Examples are not discussing devices that have been physically built and tested, though one of ordinary skill in the art having the benefit of this disclosure will understand how to fabricate our devices.

Figure 1:
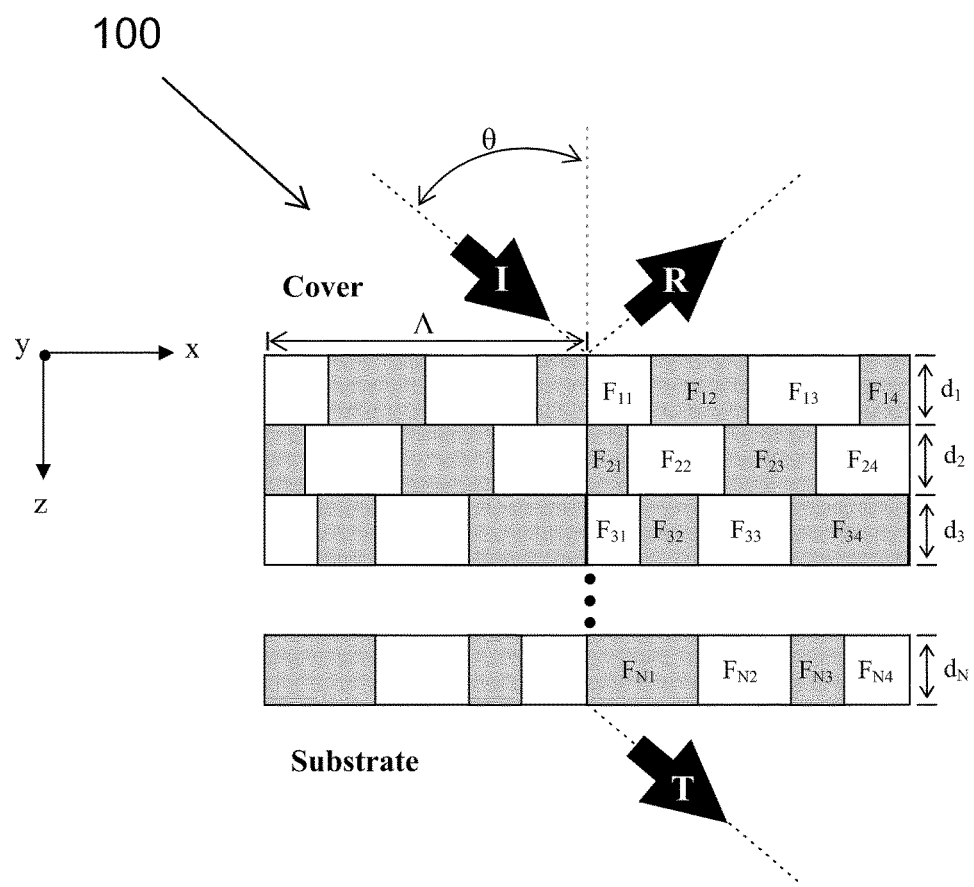
FIG. 1 is a schematic illustration of a cross-section of a multilayer diffractive structure.

With reference to FIG. 1, the interaction of a multilevel diffractive structure 100 and an incident electromagnetic plane wave (I) is shown schematically with key parameters. The number of levels (layers) is denoted by N, $d_i$ (i=1, ..., N) is the thickness of the i-th layer, Λ is the period of the structure, and fill factors (fractions of period with high or low refractive indices) are shown by $F_{ij}$ (j=1, ..., M; M is the number of subparts in each period in the i-th layer). In each period, darker sections correspond to the parts with a higher refractive index or dielectric constant. In the model, if a particular fill factor is set to unity while the other fill factor is set to zero, the layer is a homogeneous layer. FIG. 1 shows spatial periodic variations only along the x-axis, which renders this structure periodic in only one dimension (1D). However, simultaneous spatial variations along the y-axis are also possible. For example, the structure may have a similar cross-section along the y-axis as is shown in FIG. 1 for the x-axis. Taking a spatial periodic variation along both x and y directions in the i-th layer, for example, renders that layer a two-dimensional (2D) periodic slab. If multiple layers are modulated in this way, the structure takes on a three dimensional (3D) form that can incorporate both 1D (modulated along x or y or any direction in between) and 2D (modulated along x and y) layers in a great variety of designs.

The substrate in FIG. 1 is shown below the spatially modulated periodic layers. In some embodiments the substrate may be a homogenous layer of silica ($SiO_2$). Above the spatially modulated periodic layers is a cover, which may be homogeneous layer. In some embodiments, the cover may simply be a layer of air.

In FIG. 1, the incident, reflected, and transmitted plane waves have wavelength λ and intensity denoted by I, R, and T, respectively. While the incident wave can be directed at the structure at any angle, θ, the special case of normal incidence (θ=0) is of high practical interest. The incident wave can have two polarizations, transverse electric (TE) and transverse magnetic (TM). It can also have random polarization or be unpolarized. When the electric field vector is in the y direction, the polarization is known as TE; when the magnetic field is in the y direction, the polarization is known as TM. If the period of the structure is smaller than the incident wavelength, the subwavelength regime prevails; hence only the zero-order diffraction orders are propagating and the higher orders will be evanescent. The first-order or higher-order evanescent diffraction waves generated by the patterned layers induce resonances by being coupled to leaky modes. Thus, thin-film structures containing waveguide layers and periodic elements, under proper phase-matching conditions, can exhibit the guided-mode resonance (GMR) effect, also sometimes called the leaky-mode resonance effect.

To find the optimal structural parameters of a two-level, three-level, or, in general, a multilevel leaky-mode resonance element with desired spectral response, two types of mathematical tools may be employed: analysis/simulation and design/optimization tools. In the case of analysis and simulation of the proposed structures, fundamental electromagnetics equations are numerically solved with the proper boundary conditions. These numerical results, which can provide the efficiencies of the diffraction orders and also quantitative electromagnetic field distributions, may be obtained by utilizing rigorous coupled-wave analysis (RCWA) and also modal analysis methods, as is well-known to those of ordinary skill in the art. These methods also provide computational kernels in the design process.

To design the present leaky-mode resonance elements, a robust evolutionary technique known as particle swarm optimization (PSO) may be used. Although there are several well-known methods for analysis of diffraction gratings, design of these elements with strictly specified spectral properties is generally a challenging problem. Here, "spectra" refers to the wavelength or frequency spectra as well as to angular spectra. Design and synthesis techniques based on evolutionary strategies (mainly genetic algorithms) have found applications in this area. Particle swarm optimization (PSO) is a robust, stochastic evolutionary strategy that has been recently utilized in electromagnetic design problems. The algorithm finds the optimal solution by moving the particles in the search space. PSO lets every individual within the swarm move from a given point to a new one with a velocity based on a weighted combination of the individual's current velocity, best position ever found by that individual, and the group's best position.

In PSO, each particle of a swarm is considered as a point in an N-dimensional search space, which adjusts its movement according to its own experience as well as the experience of other particles. Each particle is represented by an N-parameter vector given by:

$$X_m = \{x_{1m}, x_{2m}, \ldots, x_{Nm}\} \quad 1 \leq m \leq N_{POP} \quad (1)$$

where m is an integer and indicates the position of the particle in the swarm, which comprises $N_{POP}$ particles. For numerical evaluation of the quality of particles, a fitness function (FF) is defined and computed for each particle according to its optimization parameters. The algorithm initiates by randomly locating particles moving with random velocities. Velocity is the rate of a particle's position change and is represented by $V_m = \{v_{1m}, v_{2m}, \ldots, v_{Nm}\}$. The fitness function is calculated for all particles in the initial swarm. The best previous particle position ($P_{best}$) is set initially to the first random particle position, $P_m = \{p_{1m}, p_{2m}, \ldots, p_{Nm}\}$, and the position of the best particle in the swarm ($G_{best}$, as defined by the fitness function) is kept as the swarm's best position (G). The modification of the particle's position in (k+1)th iteration can be modeled as follows:

$$V_m^{k+1} = wV_m^k + c_1 \text{rand}_1(\ )(P_m - X_m^k) + c_2 \text{rand}_2(\ )(G - X_m^k) \quad (2)$$

$$X_m^{k+1} = X_m^k + V_m^{k+1} \Delta t \quad (3)$$

where w is the inertia weight, $c_1$ and $c_2$ are called cognitive and social rates, respectively, and $\text{rand}_1(\ )$ and $\text{rand}_2(\ )$ are two uniformly distributed random numbers between 0 and 1. Equation (2) shows that the new particle's velocity has memory of the previous velocity, its own best position, and the best position of the swarm. The position of each particle is then updated according to Eq. (3), in which $\Delta t$ is the time step (here $\Delta t=1.0$). Also, $P_m$, and G are updated based on the following rules:

$P_m$ update rule: if $FF(X_m^{k+})$ is better than $FF(P_m)$, then $P_m = X_m^{k+1}$ G update rule:
if best of $FF(P_m, 1 \leq m \leq N_{POP})$ is better than $FF(G)$, then G=best of $(P_m, 1 \leq m \leq N_{POP})$.

The iterations continue, by returning to calculation of Eqs. (2) and (3), until either an optimum solution is obtained or the maximum number of iterations is met. The algorithm summarized here is referred to as standard, real-coded PSO, and is further discussed in M. Shokooh-Saremi and R. Magnusson, "Particle swarm optimization and its application to the design of diffraction grating filters," Opt. Lett. 32, 894-896 (2007).

Thus, in accordance with a preferred aspect of the present disclosure, with certain material systems available, it is possible to design multilevel broadband reflectors with desired reflectance levels and bandwidths, as well as other functional elements like polarizers and beamsplitters, and to find the proper structural parameters for fabrication of these devices, as the following examples demonstrate.

Example 1

Figure 2A:
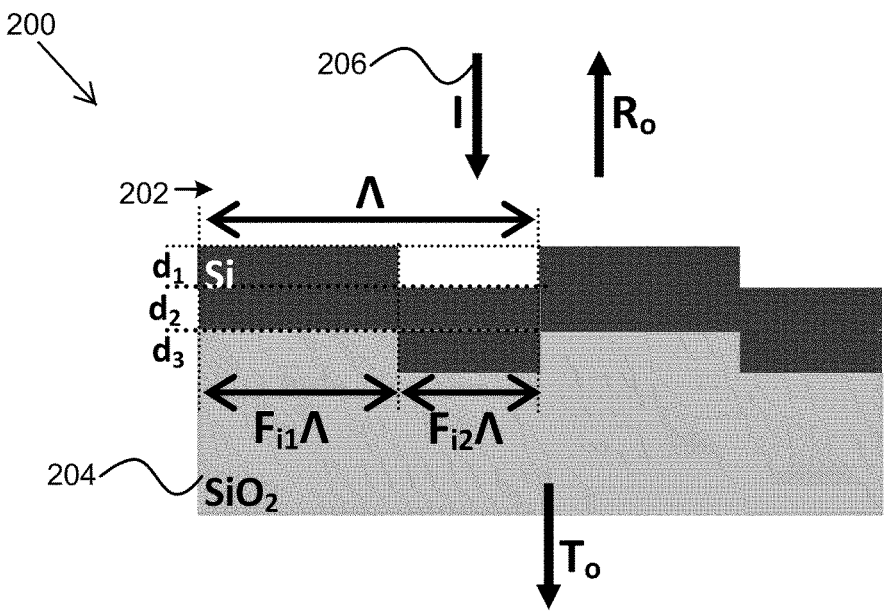
FIG. 2A is a schematic illustration of a multilayer reflector.
Figure 2B:
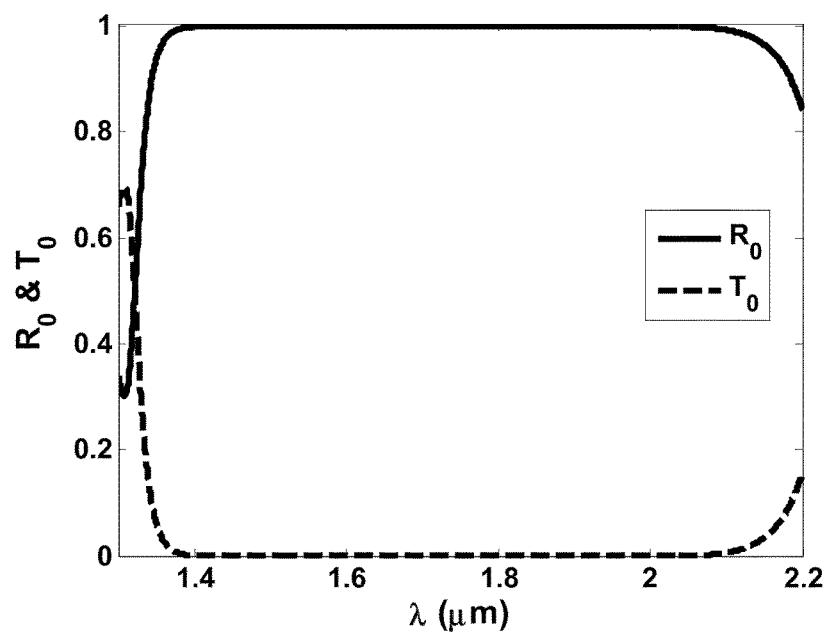
FIG. 2B is a linear spectrum of the zero-order reflectance ($R_0$) and transmittance ($T_0$) of the reflector shown in FIG. 2A for a TE-polarized input wave.
Figure 2C:
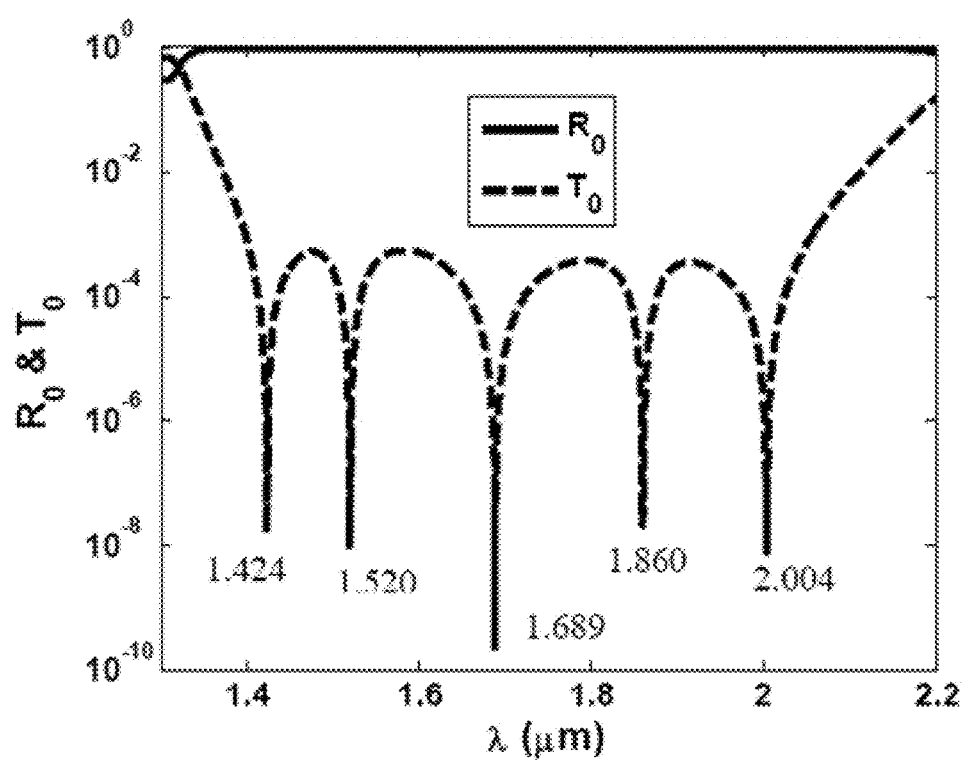
FIG. 2C is a logarithmic spectrum of the zero-order reflectance ($R_0$) and transmittance ($T_0$) of the reflector shown in FIG. 2A for a TE-polarized input wave.
Figure 3A:
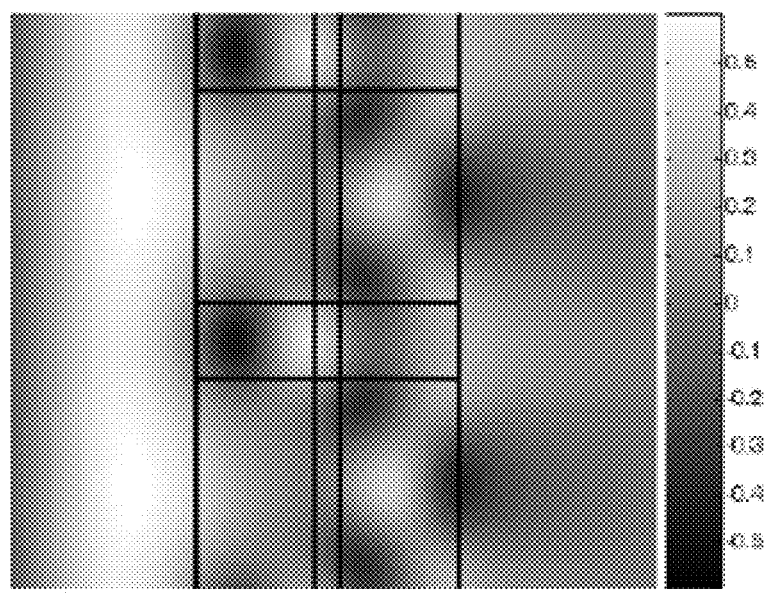
FIGS. 3A-3E are visual representations of the electric field distribution at each resonance wavelength in the broadband reflector shown in FIG. 2A under TE-polarized light illumination.
Figure 3B:
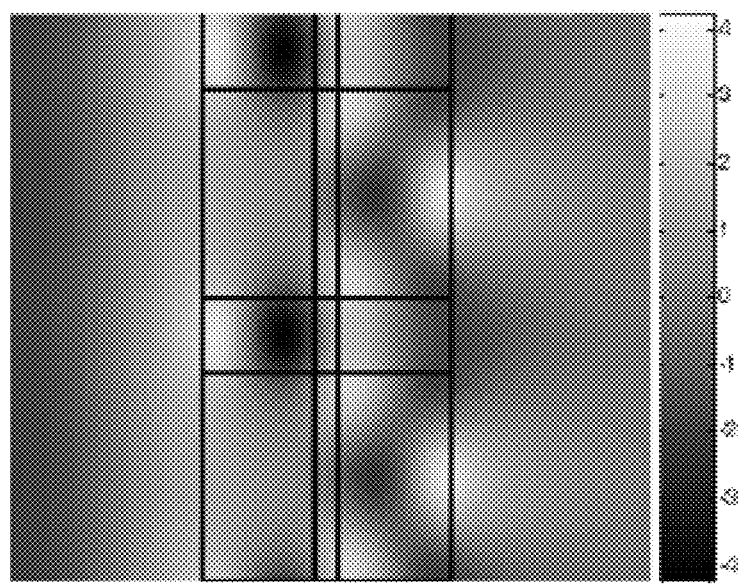
Figure 3C:
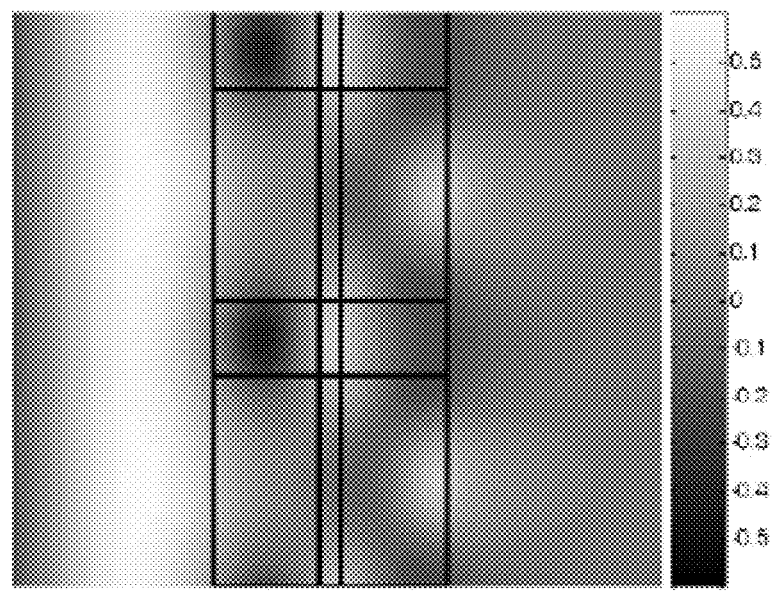
Figure 3D:
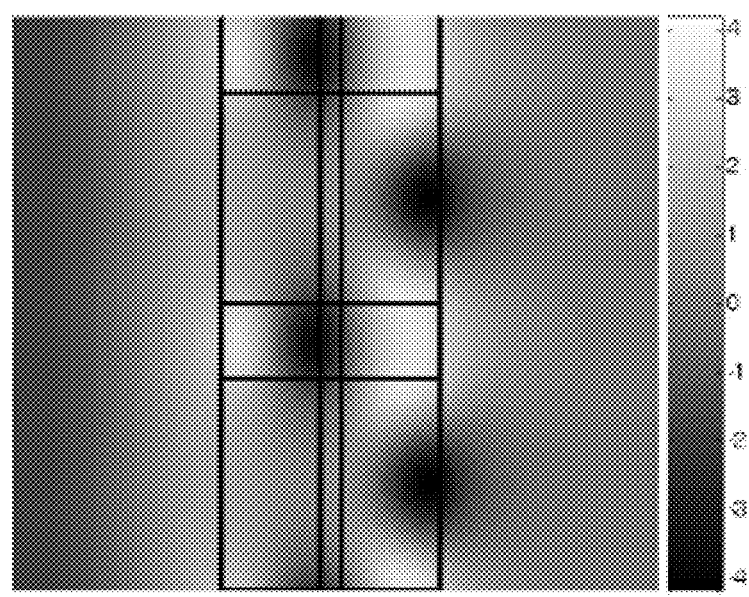
Figure 3E:
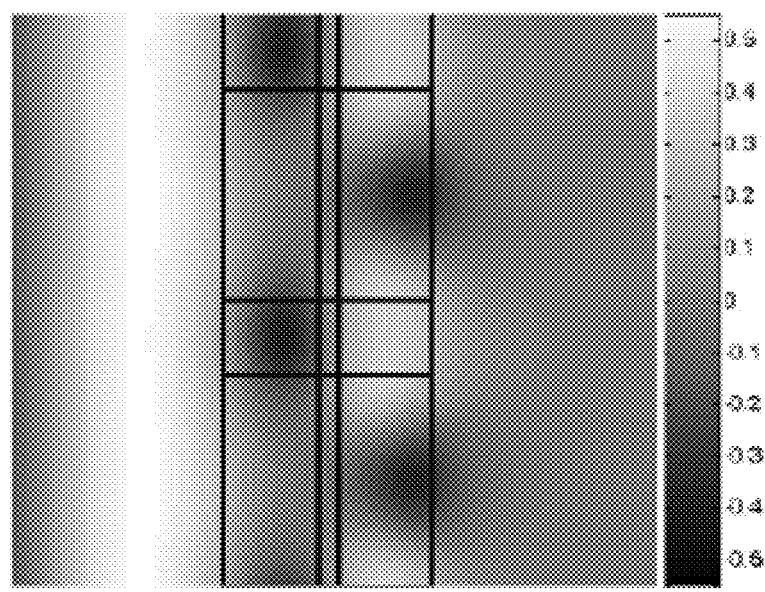

FIG. 2A shows a schematic illustration of a multilayer reflector 200. The reflection and transmission response of this broadband reflector in the 1.3-2.2 μm spectral band is shown on linear and logarithmic scales, respectively, in FIGS. 2B and 2C. In this element, the cover 202 and substrate media 204 were assumed to be air ($n_{cover}=1.0$) and silica ($n_{substrate}=1.48$), respectively. Also, the device is designed to be illuminated normally (θ=0) with TE-polarized light 206. The PSO-designed reflector 200 has an effective three-level structure that is conformal with a relief grating with a rectangular spatial profile, where the period, thickness of each layer, and the fill factors ($\Lambda$, $d_i$, $F_{ij}$) are the optimization parameters to be found by the PSO algorithm. The first layer has a depth of $d_1$ and is a periodic layer (or, even more specifically, a spatially-modulated periodic layer) that includes silicon (Si) and air. The second layer has a depth of $d_2$, and is a homogeneous (non-periodic) layer ($F_{21}$=1.0). The bottom layer has a depth of $d_3$ and is a periodic layer that includes Si and silica. The bottom layer is also an example of a spatially-modulated periodic layer that has a period that includes a first material (silica) having a first length in a first dimension (the dimension of the period) and a second material (silicon) having a second length in the first dimension, the first length being greater than the second length. In this example, the basic period and fill factors of this reflector are found to be Λ=858.8 nm and $F_{11}$=$F_{31}$=0.264 (two-part period). In addition, the thickness of the layers from the top to the bottom are determined to be $d_1$=430.5 nm, $d_2$=90.3 nm, and $d_3$=430.5 nm, respectively. The top grating is a silicon ($n_{Si}$=3.48)/air grating, and the bottom one is a silica/silicon grating. The middle homogenous layer is made of silicon. As shown in FIG. 2B, the reflection bandwidth of this broadband reflector, maintaining a reflectance exceeding 0.99, is 740 nm. This broad bandwidth is not realizable with a single-patterned silicon layer. FIG. 2C shows the corresponding reflectance and transmittance spectra on a logarithmic scale. The dips in the transmittance spectrum at wavelengths of 1.424, 1.520, 1.689, 1.860, and 2.004 micrometers (μm) evidence the presence of the leaky-mode resonances on which this device's design is based.

FIGS. 3A to 3E show the electric field distribution inside the device of FIG. 2A and in the surrounding media, at each of the five resonance wavelengths (1.424, 1.520, 1.689, 1.860, and 2.004 μm) denoted in FIG. 2C, respectively. These figures show how the electric field will be distributed in this conformal structure when each resonance takes place. In this particular design, the leaky modes will be mainly excited and concentrated in the top and bottom grating layers.

Example 2

Figure 4A:
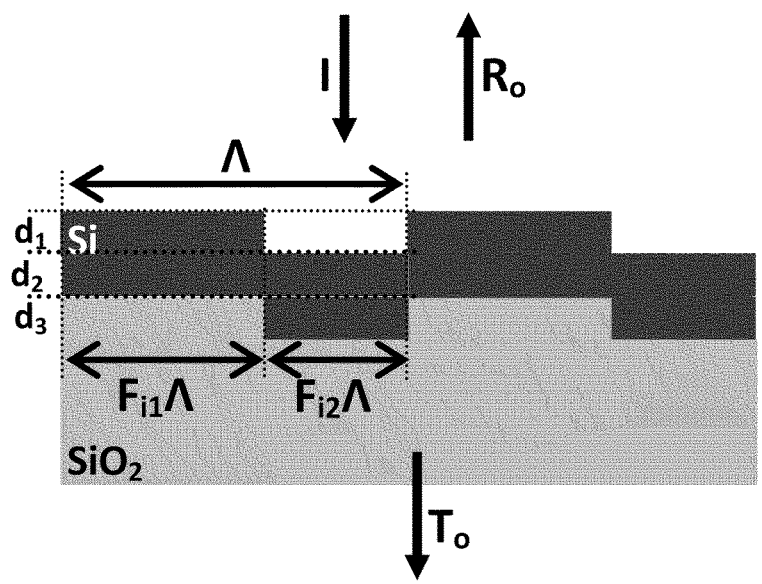
FIG. 4A is a schematic illustration of a multilayer reflector.
Figure 4B:
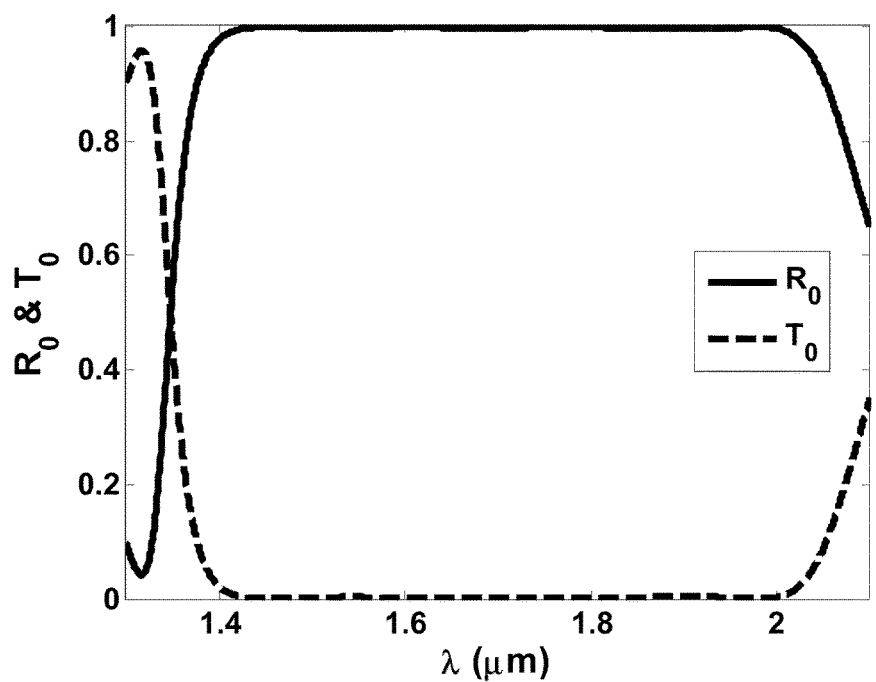
FIG. 4B is a linear spectrum of the reflectance and transmittance of the reflector shown in FIG. 4A for a TM-polarized input wave.
Figure 4C:
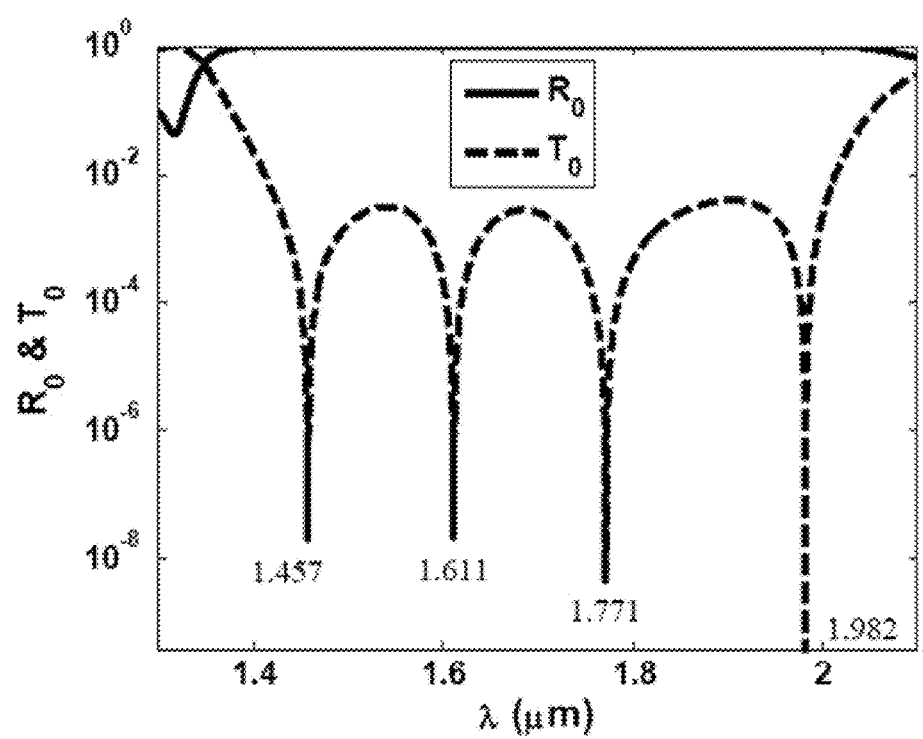
FIG. 4C is a logarithmic spectrum of the reflectance and transmittance of the reflector shown in FIG. 4A for a TM-polarized input wave.

FIG. 4A shows an example of a multilevel reflector designed for normally-oriented incident light having TM polarization. The structure of this element is similar to the structure shown in Example 1. The optimized parameters of this element, however, are determined as Λ=728 nm, $F_{11}$=$F_{31}$=0.7543 (two-part period), $F_{21}$=1.0, $d_1$=479.1 nm, $d_2$=265.9 nm, and $d_3$=479.1 nm. The bandwidth of this reflector, as shown in FIG. 4B, is 601 nm (for $R_0$>0.99) in the 1.3-2.1 μm range. As shown in FIG. 4C, four leaky-mode resonances contribute to the broad reflection spectrum.

Example 3

Figure 5A:
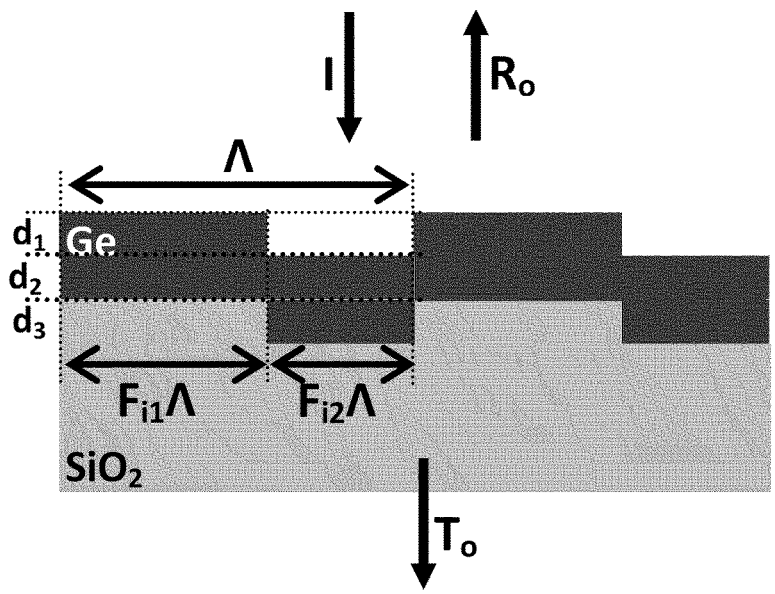
FIG. 5A is a schematic illustration of a multilayer reflector using germanium.
Figure 5B:
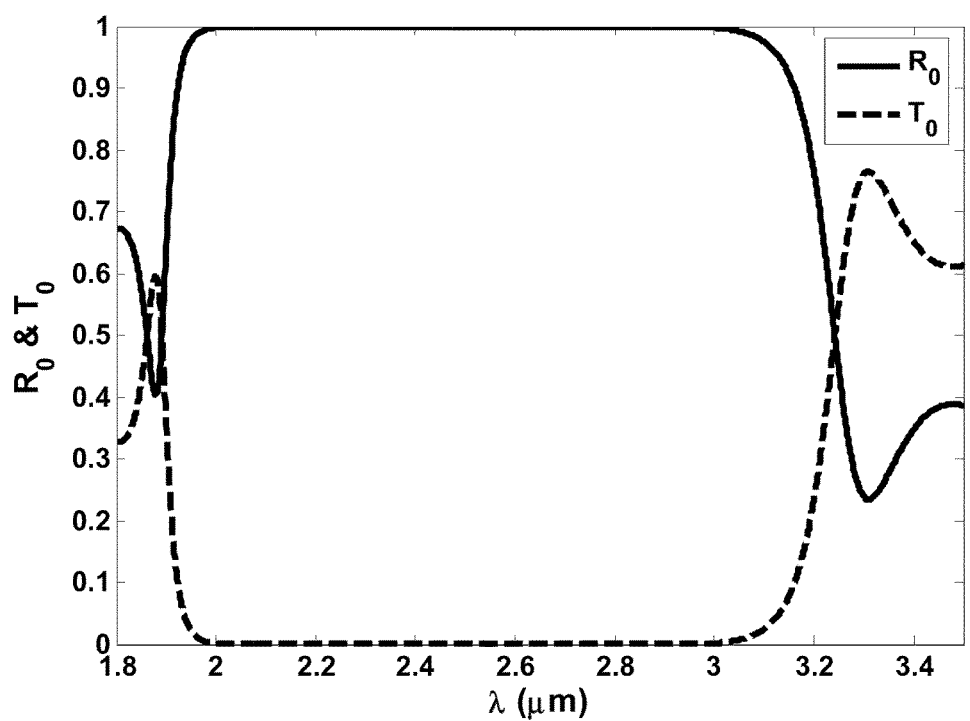
FIG. 5B is a linear spectrum of the reflectance and transmittance spectra of the reflector shown in FIG. 5A for a TE polarized input wave.
Figure 5C:
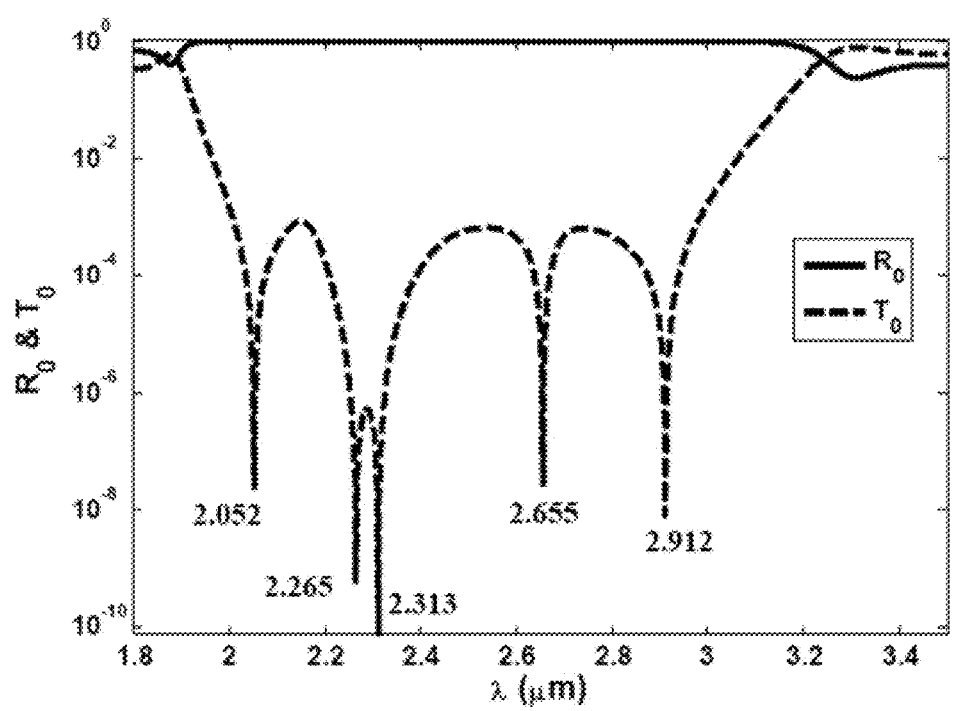
FIG. 5C is a logarithmic spectrum of the reflectance and transmittance spectra of the reflector shown in FIG. 5A for a TE polarized input wave.

FIG. 5A shows an example of a multilayer reflector designed for normally-oriented incident light having TE polarization. The use of germanium ($n_{Ge}$=4.0) in the mid-infrared (IR) band (particularly here 1.8-3.2 μm) can considerably increase the reflectance bandwidth of a multilevel leaky-mode reflector. The higher refractive index of germanium provides higher refractive index contrast in the grating regions. This can result in broadening of the leaky-mode resonances and enhance their interaction and overlap. Therefore, a broader and flatter reflection response is realizable. The parameters delivered by the PSO algorithm for this specified reflector for TE polarization are Λ=1080.3 nm, $F_{11}$=$F_{31}$=0.2530, $F_{21}$=1.0, $d_1$=532.8 nm, $d_2$=126.4 nm, and $d_3$=532.8 nm. The bandwidth of this reflector, as shown in FIG. 5B, is 1097 nm (for $R_0$>0.99) in the 1.8-3.2 μm range. Silica has a refractive index of ~1.42 in this band. FIG. 5C shows that this reflector has five leaky-mode resonances that contribute to the broad reflection spectrum.

Example 4

Figure 6A:
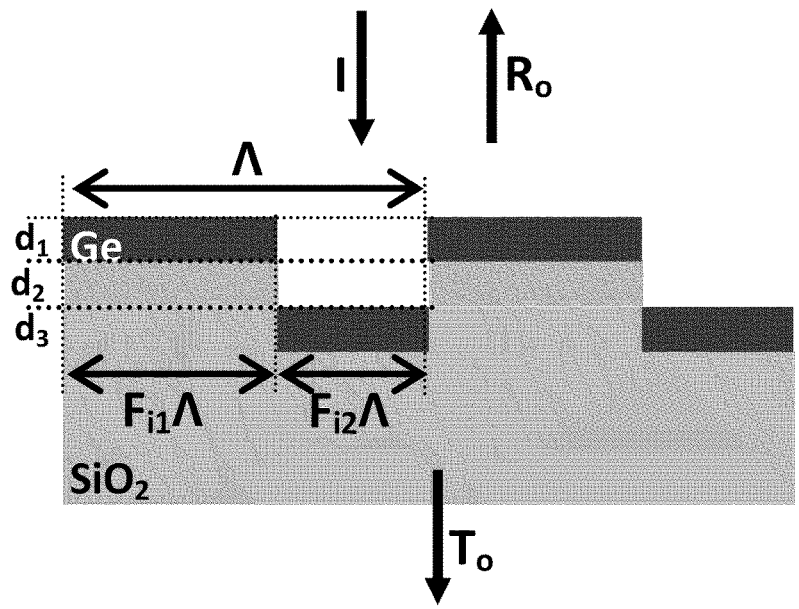
FIG. 6A is a schematic illustration of a multilayer reflector using germanium.
Figure 6B:
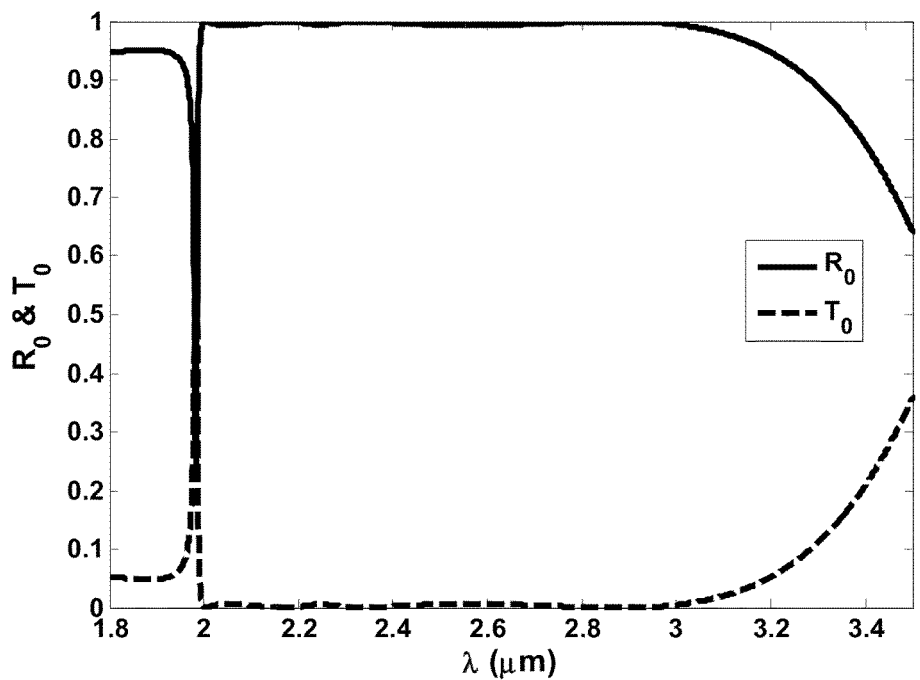
FIG. 6B is a linear spectrum of the reflectance and transmittance spectra of the reflector shown in FIG. 6A for a TM polarized input wave.
Figure 6C:
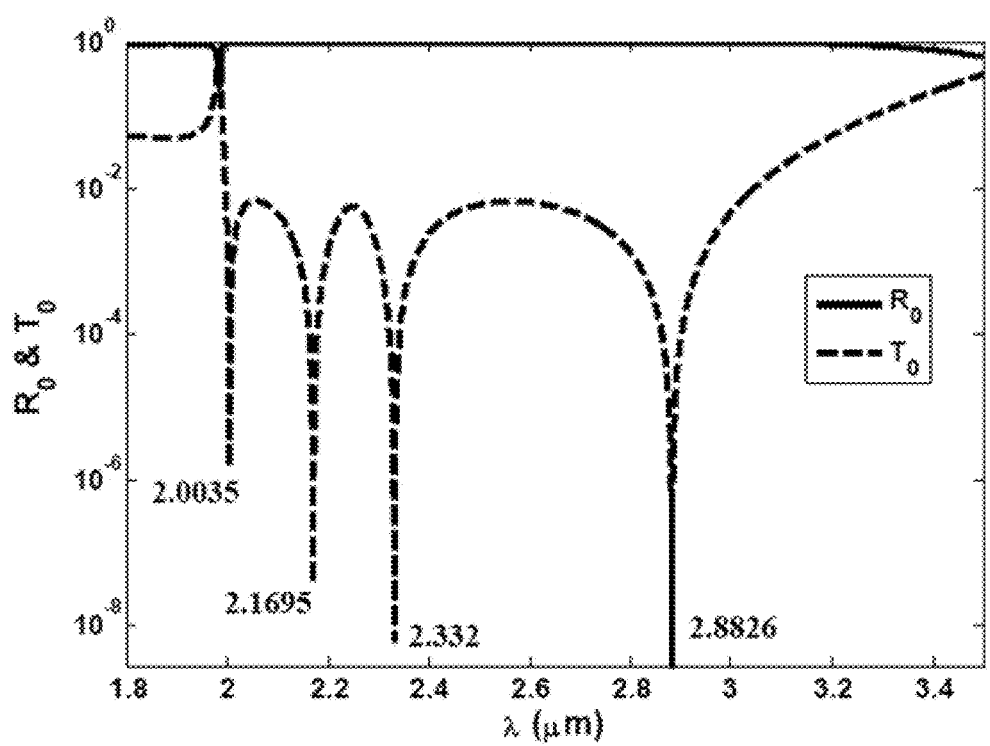
FIG. 6C is a logarithmic spectrum of the reflectance and transmittance spectra of the reflector shown in FIG. 6A for a TM polarized input wave.

FIG. 6A shows an example of a multilayer reflector designed for normally-oriented incident light having TM polarization. A difference between this structure and the structure in FIG. 5A for TE polarization is that all three levels comprise periodic layers and there is no homogeneous layer present. In this example, the parameters of the element are determined to be Λ=1077.5 nm, $F_{11}$=$F_{21}$=$F_{31}$=0.7435, $d_1$=565 nm, $d_2$=874.7 nm, and $d_3$=565 nm. The bandwidth of this reflector, as shown in FIG. 6B is 1050 nm (for $R_0$>0.99) in the 1.8-3.2 μm range. FIG. 6C shows that this reflector has four leaky-mode resonances that contribute to the broad reflection spectrum.

Example 5

Figure 7A:
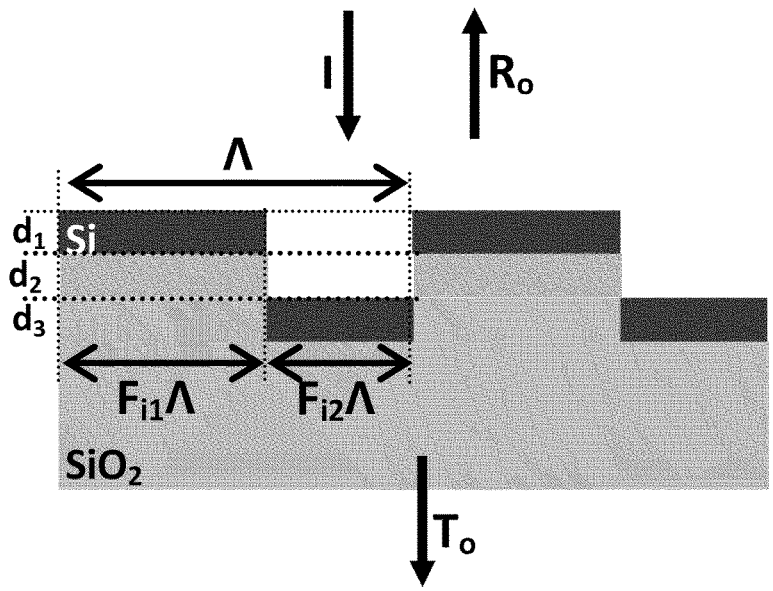
FIG. 7A is a schematic illustration of a multilayer polarizer.
Figure 7B:
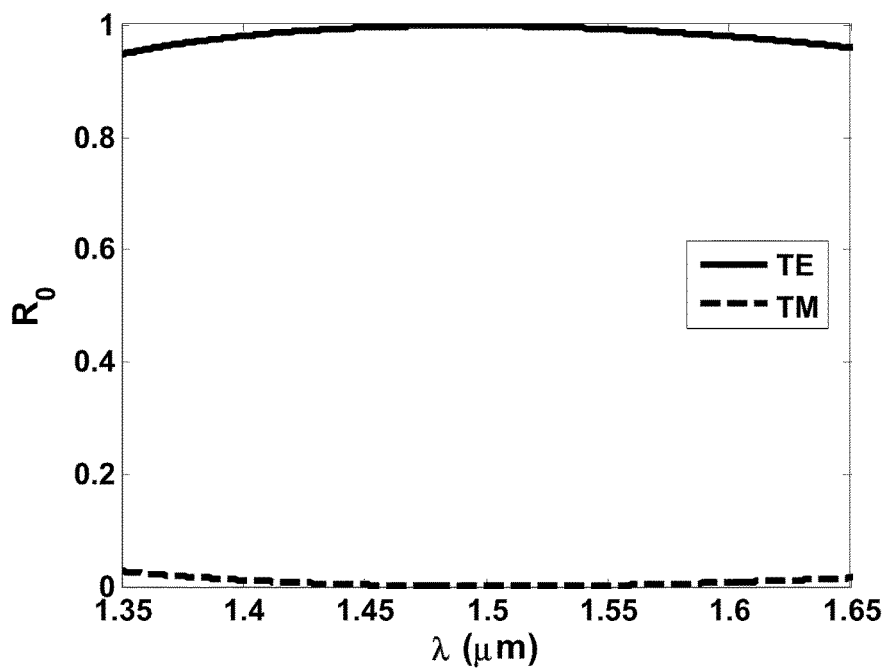
FIG. 7B is a linear spectrum of the polarizer shown in FIG. 7A for the 1.35-1.65 μm wavelength band.

The multilevel leaky-mode resonance structures described here may be used to create a variety of optical elements having many functionalities. Referring to the device in FIG. 7A, the reflectance response of this PSO-designed polarizer in the 1.35-1.65 μm wavelength band for both TE and TM polarizations is shown in FIG. 7B. This three-level resonant leaky-mode polarizer is designed to operate under normal incidence, θ=0, with a polarization P=($R_{TE}$−$R_{TM}$)/($R_{TE}$+$R_{TM}$). Silicon is the high-refractive-index material applied in this design. The parameters of this element are found as Λ=667.1 nm, $F_{11}$=$F_{21}$=$F_{31}$=0.5424, $d_1$=166 nm, $d_2$=66.4 nm, and $d_3$=166 nm. The bandwidth of this polarizer, as shown in FIG. 7B, is ~300 nm (for P≥0.95) in the 1.35-1.65 μm range. This device is designed to reflect the normally incident TE-polarized light and transmit the light with TM polarization. Thus, this device is an example of a polarizer having a reflectance bandwidth equal to or greater than 100 nanometers in one of a TM polarization and a TE polarization of an incident wave, and a transmission bandwidth equal to or greater than 100 nanometers in the other of the TM polarization and the TE polarization of the incident wave.

Example 6

FIGS. 8A and 8B and FIGS. 9A and 9B show modeled examples of the application of three-level leaky-mode structures as optical beamsplitters in the optical telecommunication C-band (1528-1560 nm). These structures are designed as nonpolarizing beam splitters (NPBS), which divide the input light beam into two beams traveling in different directions regardless of their polarization. NPBSs can be designed for normal and oblique incident light and are utilized in many optical systems, including interferometers. A common power division fraction is 50/50, but other ratios are also available.

Figure 8A:
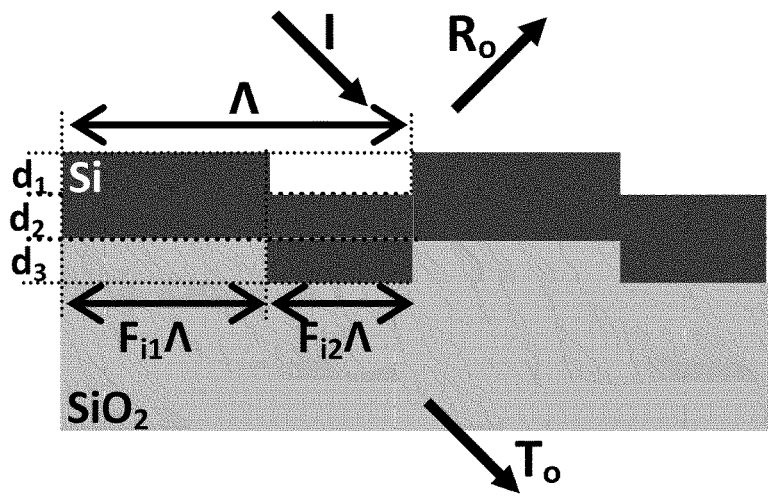
FIG. 8A is a schematic illustration of a multilayer 50/50 beamsplitter.
Figure 8B:
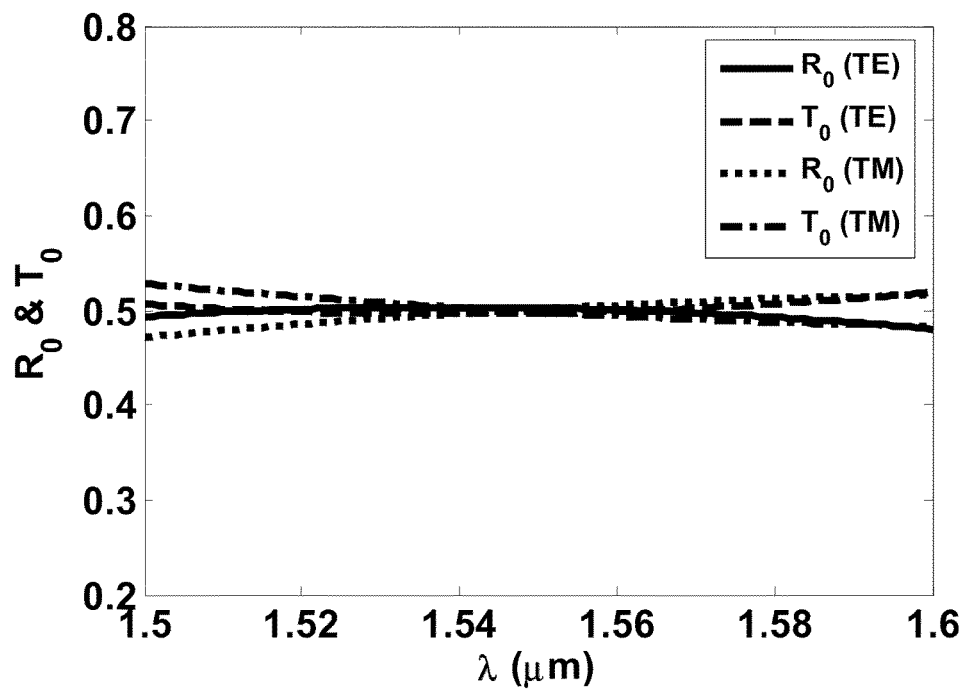
FIG. 8B is a linear spectrum of the beamsplitter shown in FIG. 8A for the reflectance and transmittance for both TE and TM polarizations over the 1.5-1.6 μm spectral band under oblique illumination.

FIG. 8A depicts multilevel device designed as a beamsplitter with a 50/50 response designed for oblique incidence (θ=45°). This Si/SiO$_2$-based beamsplitter provides a nearly flat response ($R_0$=$T_0$=0.5) over the 1500-1600 nm band for both TE and TM polarizations. The parameters of this conformal three-level leaky-mode device delivered by the PSO algorithm to meet the a priori specification of the spectrum are Λ=300 nm, $F_{11}$=$F_{31}$=0.1986, $F_{21}$=1.0, $d_1$=295 nm, $d_2$=128.8 nm, and $d_3$=295 nm. FIG. 8B shows the reflectance and transmittance response of the beamsplitter shown in FIG. 8A. As can be seen in FIG. 8B, the transmittance and reflectance of TE and TM polarized light is designed to be very close to 50% for a bandwidth of about 0.1 μm.

Example 7

Figure 9A:
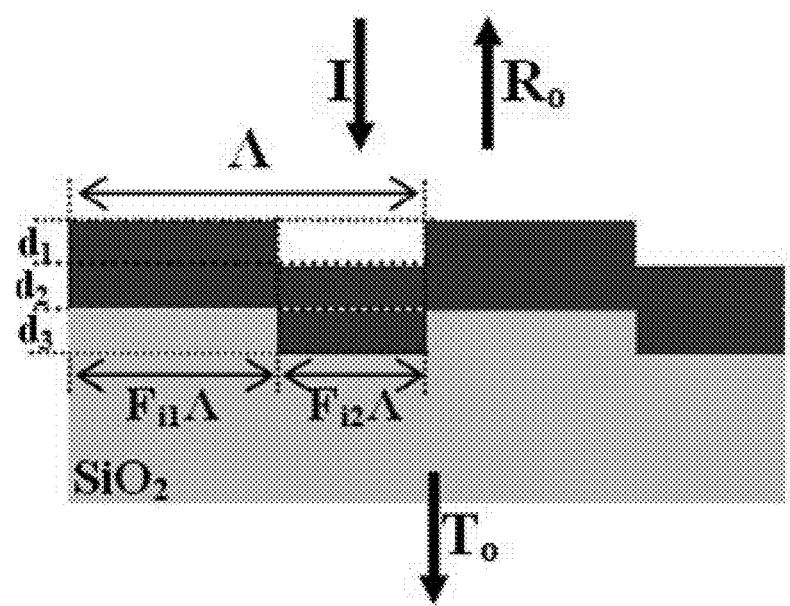
FIG. 9A is a schematic illustration of a multilayer 50/50 beamsplitter.
Figure 9B:
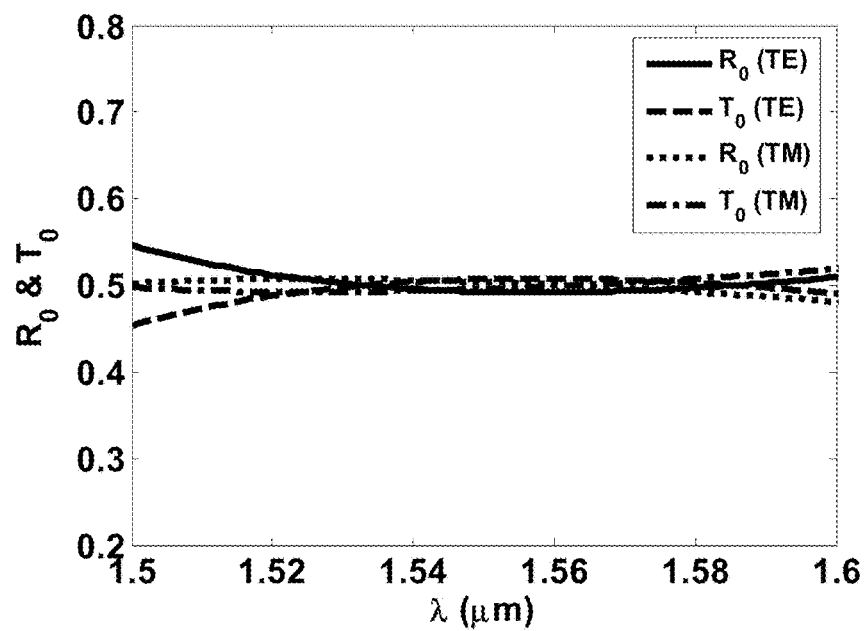
FIG. 9B is a linear spectrum of the beamsplitter shown in FIG. 9A for the reflectance and transmittance for both TE and TM polarizations over the 1.5-1.6 μm band under normal illumination.

FIG. 9A shows an example of a multilayer 50/50 nonpolarizing beamsplitter designed for light having normal incidence (θ=0°). In this example, silicon is used as the material with a high refractive index. This PSO-designed three-level element has the following parameters: Λ=964 nm, $F_{11}$=$F_{31}$=0.8869, $F_{21}$=1.0, $d_1$=259.2 nm, $d_2$=105.7 nm, and $d_3$=259.2 nm. FIG. 9B shows the reflection and transmission response of the beamsplitter shown in FIG. 9A for light having TE and TM polarization. This element is designed to provide good beam-splitting functionality over the 1500-1600 nm band.

Example 8

Figure 10A:
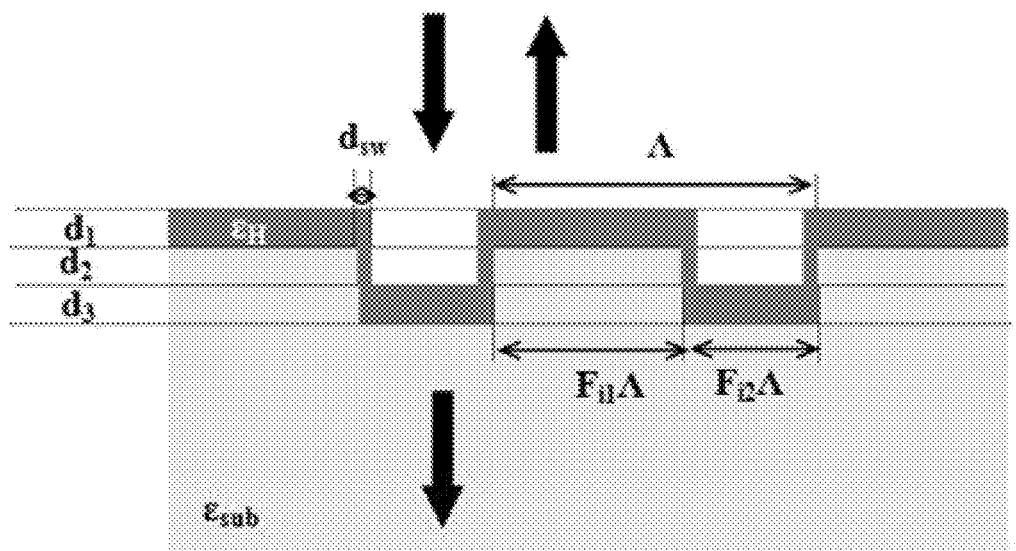
FIG. 10A is a multilayer reflector configured to operate in the microwave frequency range.
Figure 10B:
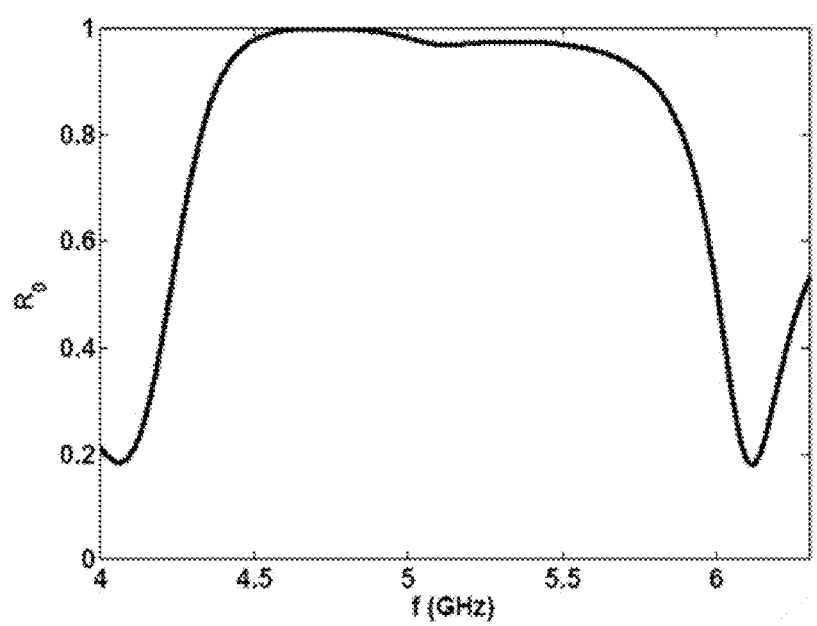
FIG. 10B is the reflectance spectrum of the reflector shown in FIG. 10A in the microwave frequency range of 4-6 GHz for TE polarization and normal incidence illumination.

Referring to FIGS. 10A, 10B, 11A and 11B, again by utilizing the multilevel guided-mode resonance device concept, filters can be designed in the microwave region of the electromagnetic spectrum. FIG. 10A shows an example of such a multilevel reflector. The dielectric constants of the substrate and the coating material are 2.19 ($\epsilon_{sub}$) and 12.11 ($\epsilon_H$), respectively. These dielectric constants exemplify microwave materials that may be useful in such devices. As those of ordinary skill in the art will understand, numerous other materials may be used in these applications, such as those (and their parameters) provided in M. Golio (ed.), The RF and Microwave Handbook, (CRC Press, Boca Raton, 2001). The incidence medium has the dielectric constant of unity (air). With reference to FIG. 10A, the PSO-designed reflector has the following parameters: Λ=3.06 cm, $F_{11}$=$F_{21}$=$F_{31}$=0.3084, $d_1$=1.22 cm, $d_2$=0.22 cm, and $d_3$=1.22 cm. In this example, a sidewall thickness of $d_{sw}$=0.25$d_1$ is assumed. As shown in FIG. 10B, the spectral width of this reflector is ~1.21 gigahertz (GHz) centered at 5 GHz. FIG. 10B shows the reflectance response of the structure shown in FIG. 10A for light having TE polarization.

Example 9

Figure 11A:
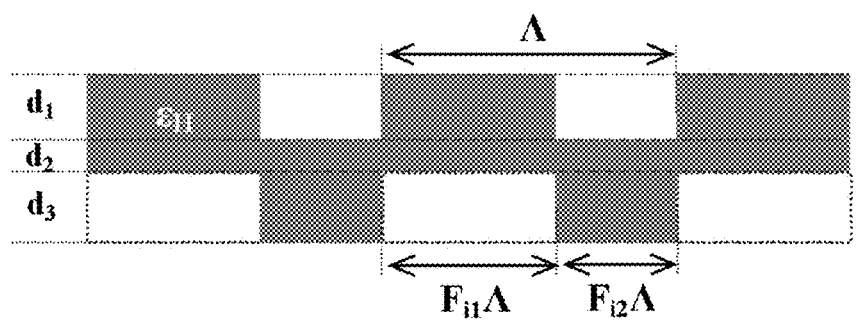
FIG. 11A is a multilayer reflector configured to operate in the microwave frequency range.
Figure 11B:
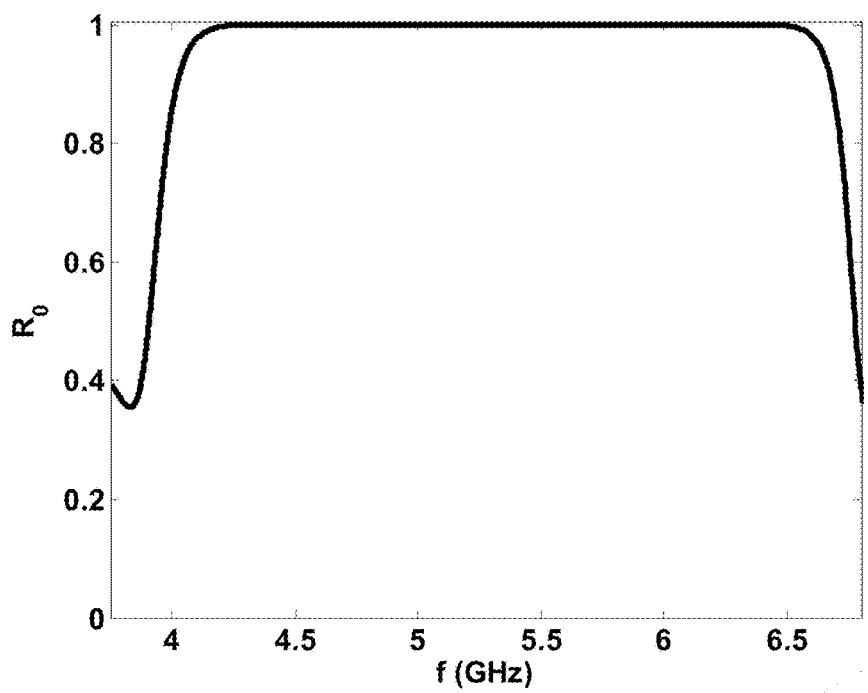
FIG. 11B is the reflectance spectrum of the reflector shown in FIG. 11A in the microwave frequency band of 4-6.5 GHz for TE polarization and normal incidence illumination.

FIG. 11A shows a three-layer, air-suspended broadband microwave reflector for TE polarized waves under normal incidence. The materials are the same as those described with regard to FIG. 10A. The structural parameters of this broadband reflector are: Λ=2.92 cm, $F_{11}$=$F_{31}$=0.2454, $F_{21}$=1.0, $d_1$=1.43 cm, $d_2$=0.36 cm, and $d_3$=1.43 cm. As shown in FIG. 11B, the spectral width of this reflector is ~2.43 GHz centered at 5.35 GHz.

Example 10

Figure 12A:
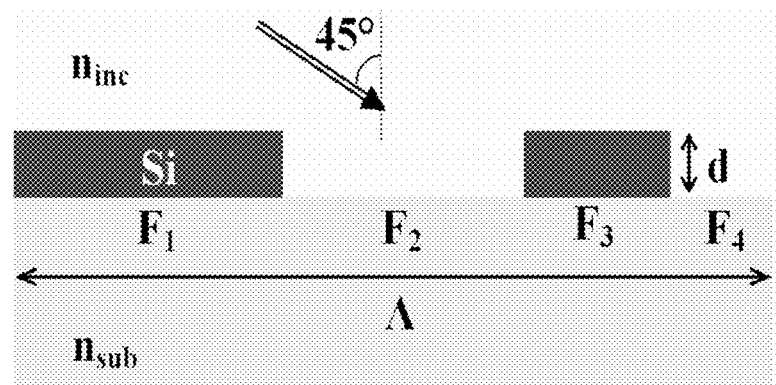
FIG. 12A is a schematic illustration of a single-layer silicon-on-insulator nonpolarizing beamsplitter under θ=45° incidence.
Figure 12B:
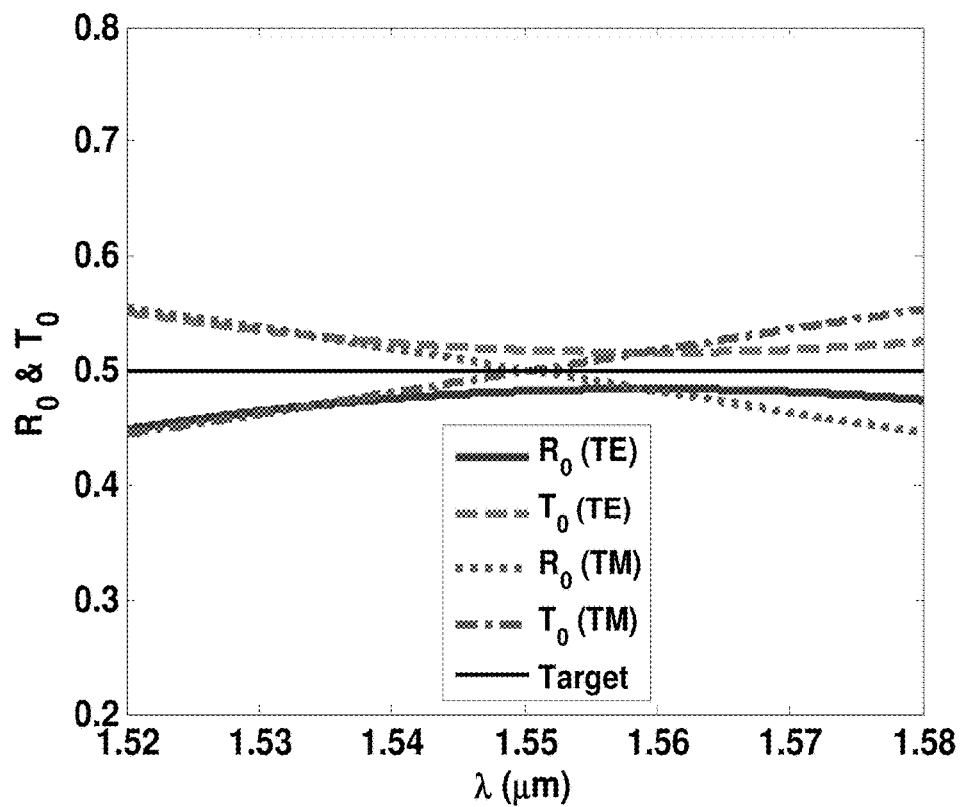
FIG. 12B shows the target and computed reflectance (R0) and transmittance (T0) for the element shown in FIG. 12A of the TE and TM polarization components under oblique (θ=45°) illumination.
Figure 12C:
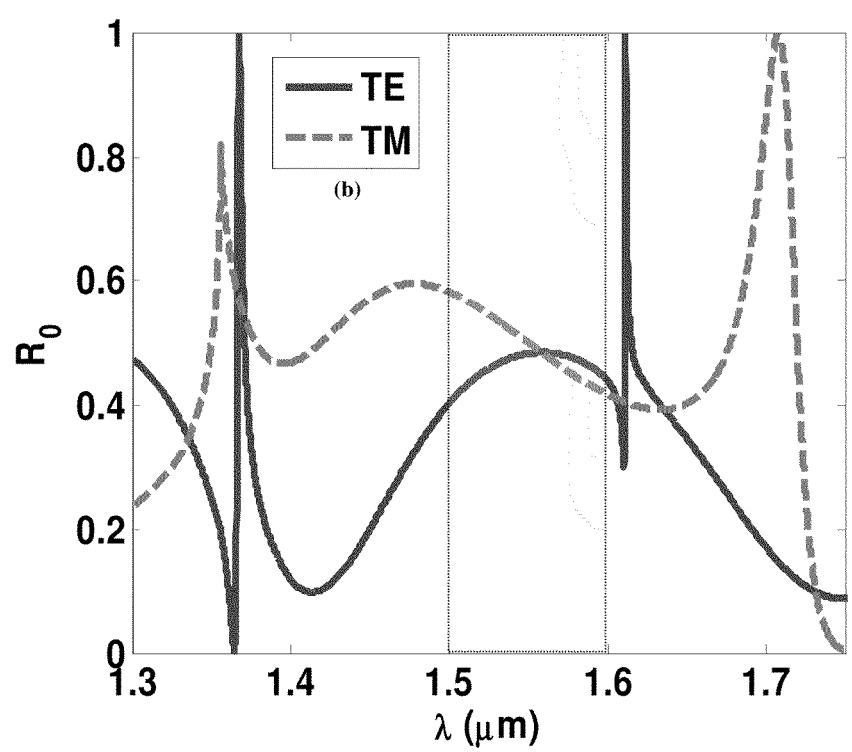
FIG. 12C shows a spectral view of the reflectance of the element shown in FIG. 12A.

We designed other GMR-NPBSs using PSO aiming for ~50/50 beam division across the 1520-1580 nm optical wavelength band. The first example has a single-layer silicon-on-insulator (SOI) structure as shown in FIG. 12A. The period (Λ) of the grating layer is divided into four parts with filling factors $F_1$ to $F_4$ (fractions of each section normalized to the period). The grating thickness is denoted as d. The refractive indices of silicon and fused-silica substrate are 3.48 and 1.48, respectively, and were approximated as constants. FIG. 12B shows computed reflectance ($R_0$) and transmittance ($T_0$) of the TE and TM polarization components under oblique (θ=45°) illumination, and also shows the target. The structural parameters of this PSO-designed element are Λ=620 nm, d=957 nm, and {$F_1$, $F_2$, $F_3$, $F_4$}={0.0826, 0.2716, 0.3686, 0.2772}. A broader spectral view of the reflectance is shown in FIG. 12C. As FIG. 12C shows, the overlap region in the 1500-1600 nm range falls between two resonances for each polarization state, which demonstrates that this nonpolarizing beam splitter is designed to rely on spectral features associated with leaky-mode resonance.

Figure 12D:
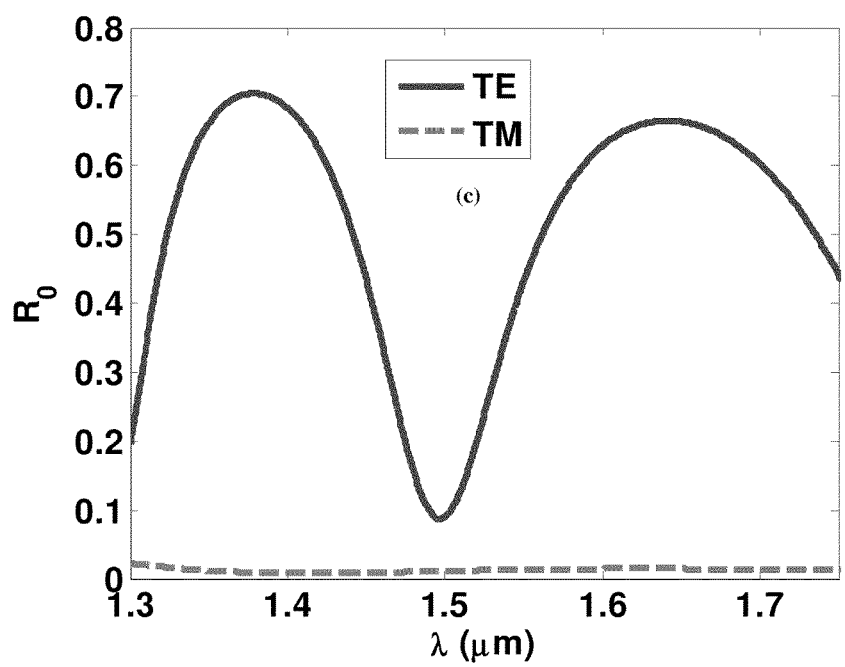
FIG. 12D shows the reflectance of the second-order effective-medium theory thin-film approximation of the periodic element shown in FIG. 12A. Light with TE (TM) polarization has its electric-field (magnetic-field) vector normal to the plane of incidence.

Although FIG. 12C reveals unambiguous spectral expressions associated with leaky-mode resonance, we computationally investigated what extent the sought polarization properties might be due to effective-medium characteristics of the subwavelength periodic layers, since the structure exhibits the desired performance away from the resonance peaks. Applying effective-medium theory (EMT), we replaced the periodic layer by its homogeneous equivalent with second-order EMT index of refraction and computed the response for both polarizations. Second-order EMT refractive index, which is wavelength/period-dependent, is an acceptable approximation in high refractive index contrast grating structures. FIG. 12D shows that the resulting element is far from being a 50/50 beamsplitter; indeed, the TM response is antireflective.

Example 11

Figure 13A:
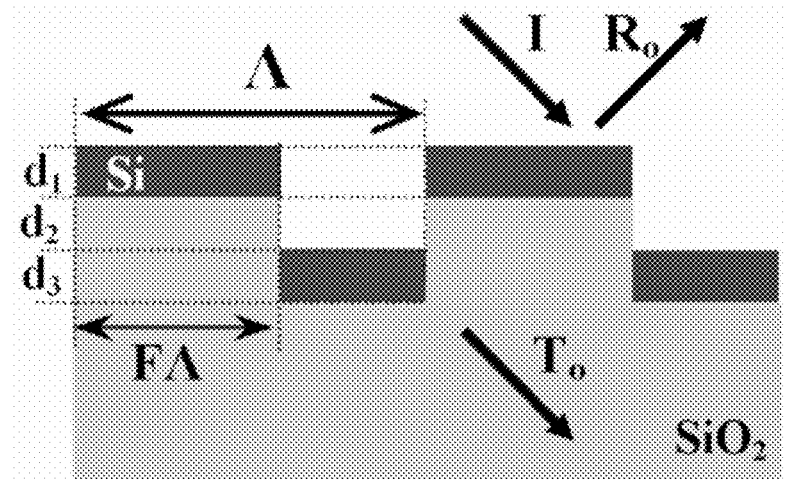
FIG. 13A is a schematic illustration of a three-level nonpolarizing beam splitter designed for oblique incidence (θ=45°).
Figure 13B:
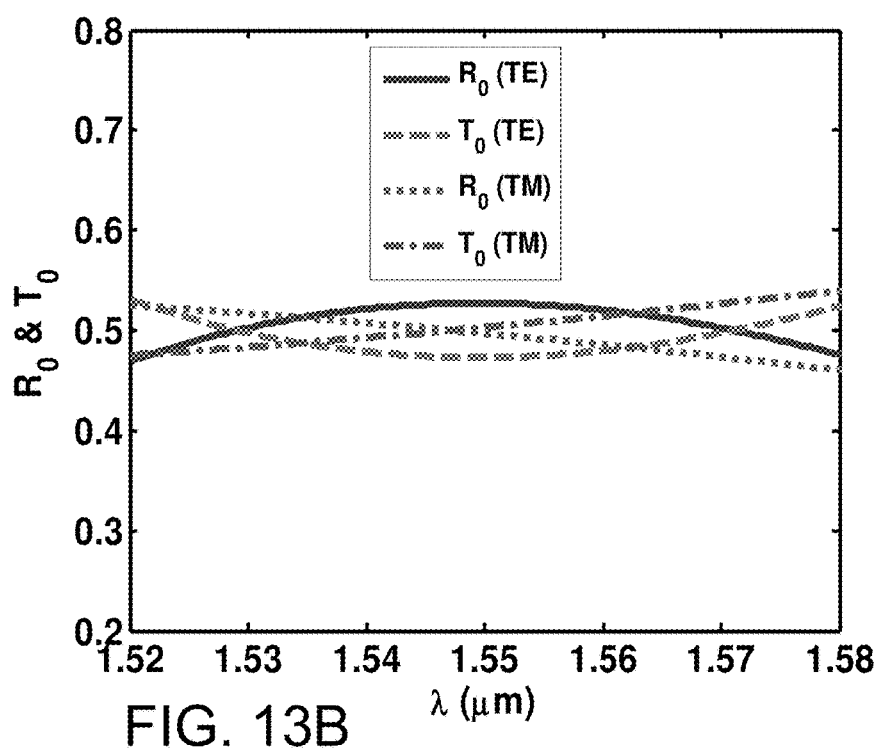
FIG. 13B shows reflectance and transmittance of the element shown in FIG. 13A.

FIGS. 13A-13D demonstrate the application of three-level leaky-mode structures to design another optical nonpolarizing beamsplitter. In particular, FIG. 13A shows a 50/50 NPBS designed for oblique incidence (θ=45°), and FIG. 13B shows the reflectance and transmittance of the element.

Figure 13C:
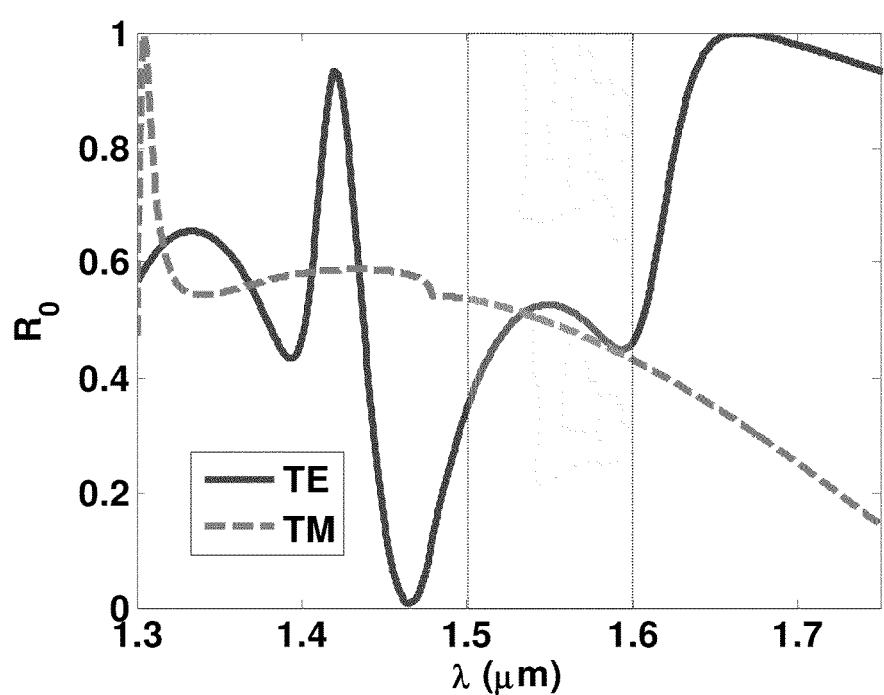
FIG. 13C shows a spectral view of the reflectance response of the element shown in FIG. 13A.
Figure 13D:
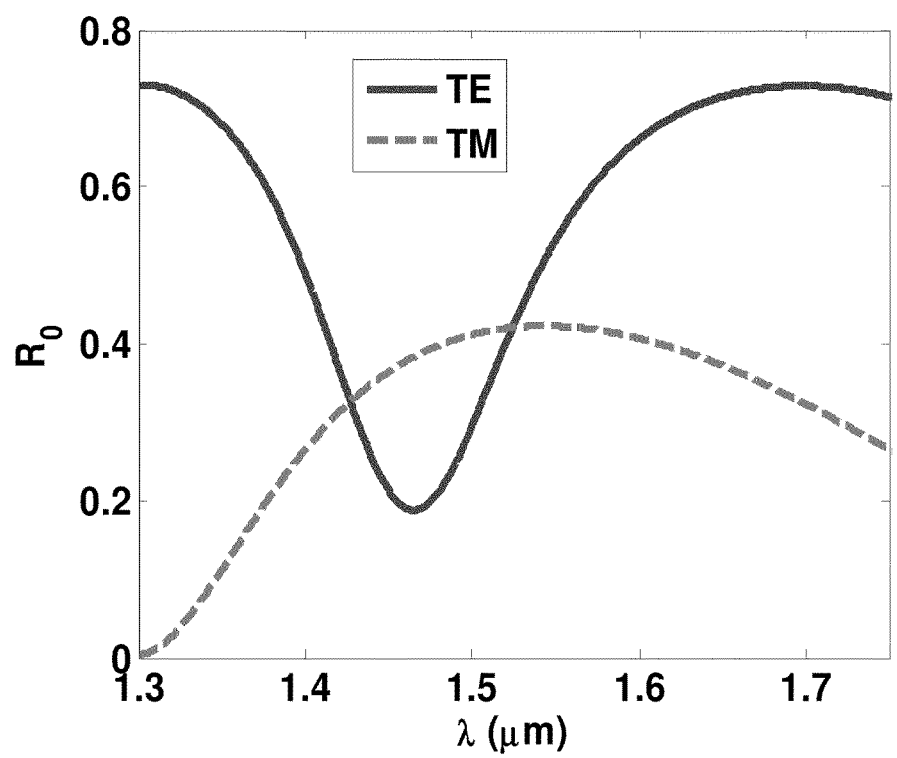
FIG. 13D shows the reflectance of the three-layer EMT thin-film approximation of the periodic element shown in FIG. 13A. The layers' second-order effective refractive indices are used for TE and TM polarizations.

This Si/SiO$_2$-based beamsplitter provides a nearly flat response ($R_0$=$T_0$=0.5) over the 1520-1580 nm band for both TE and TM polarizations, thus covering the optical telecommunication C-band (1528-1565 nm). The parameters of this three-level leaky-mode device designed using the PSO algorithm to meet the target spectral specifications are Λ=676 nm, F=0.23, $d_1$=356 nm, $d_2$=117 nm, and $d_3$=356 nm. In addition, FIG. 13C shows a broader spectral view of the reflectance, indicating the presence of leaky modes. FIG. 13D illustrates the response of the three-layer EMT homogeneous thin-film approximation of the periodic element, and shows that this qualitative thin-film counterpart does not provide the desired spectral features.

Figure 13E:
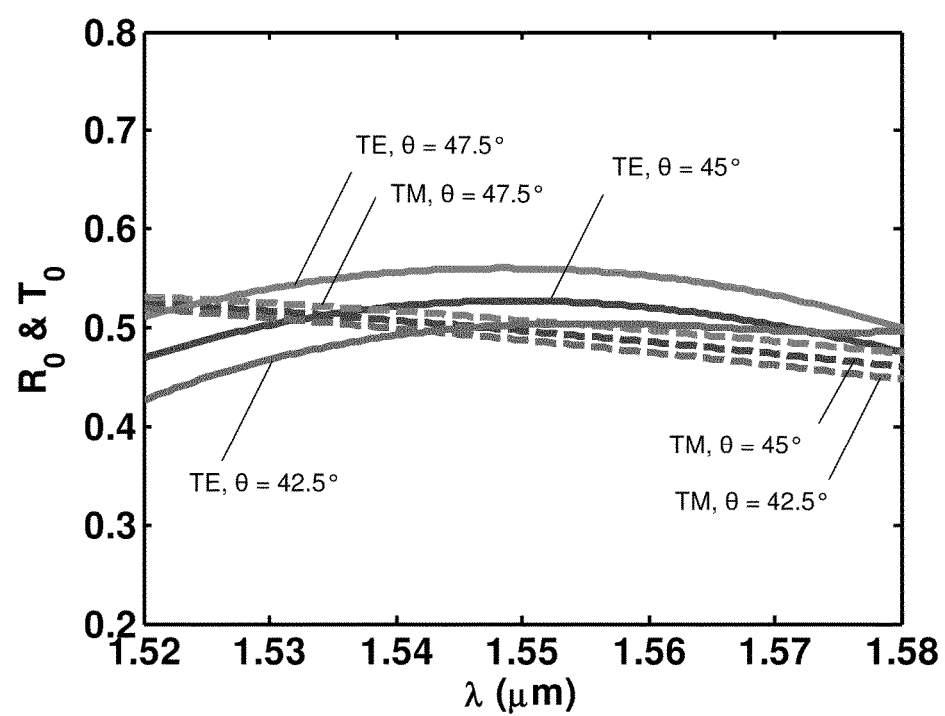
FIG. 13E shows the reflectance response of the element shown in FIG. 13A versus a ±2.5 degree deviation in the angle of incidence ($\theta_i$).

We investigated the angular sensitivity of the resonant nonpolarizing beamsplitter shown in FIG. 13A, which is designed to operate under a 45° angle of incidence, to assess its tolerance to deviations in the angle of incidence. FIG. 13E illustrates the reflection response of this device with respect to ±2.5° deviation in the angle of incidence. As seen, the reflectance remains between 0.45 and 0.55 for this angular deviation level.

Figure 13F:
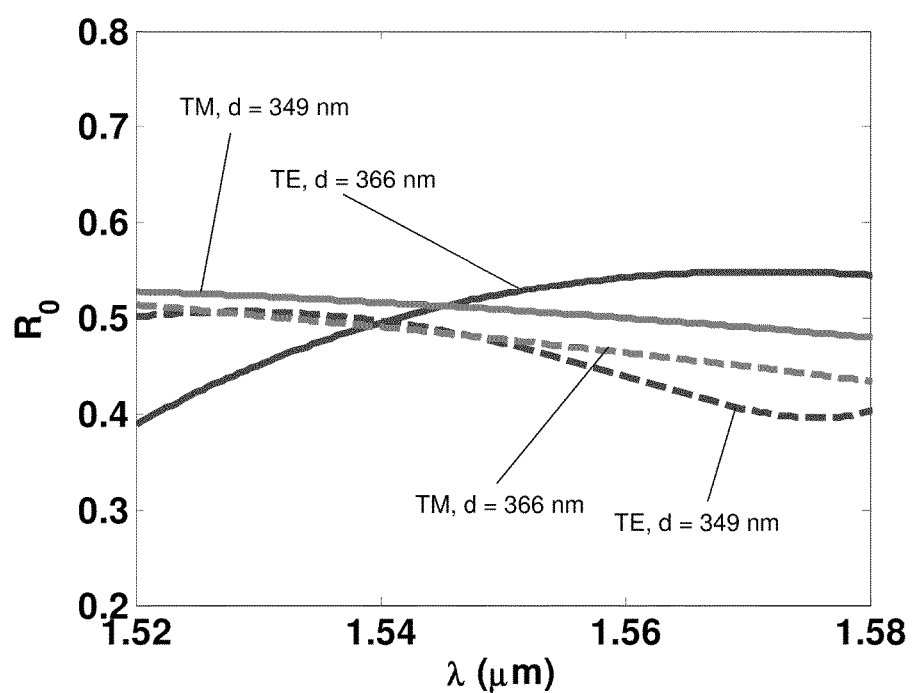
FIG. 13F shows the reflectance response of the element shown in FIG. 13A versus a ±2.5 degree deviation in d.
Figure 13G:
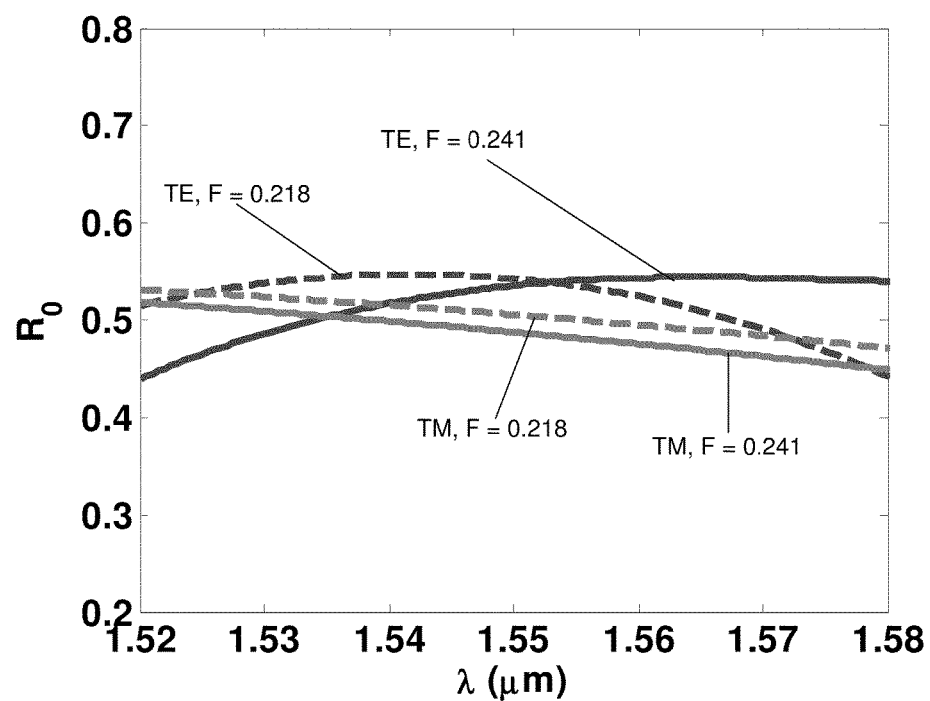
FIG. 13G shows the reflectance response of the element shown in FIG. 13A versus a ±2.5 degree deviation in F.

As discussed in more detail below, fabrication of the disclosed multilevel elements may be accomplished by deposition of a medium with high refractive index on an appropriate surface-relief pattern etched into a substrate with a low refractive index. We conducted a prefabrication and manufacturability analysis of the computed performance of the device shown in FIG. 13A relative to deviations in its structural parameters. FIGS. 13F and 13G show reflectance spectra of that design computed for representative deviations in silicon thickness (d=$d_1$=$d_3$) and grating fill factor (F), respectively. As these figures show, this particular device is more tolerant to deviations in fill factor than layer thickness.

Example 12

Figure 14A:
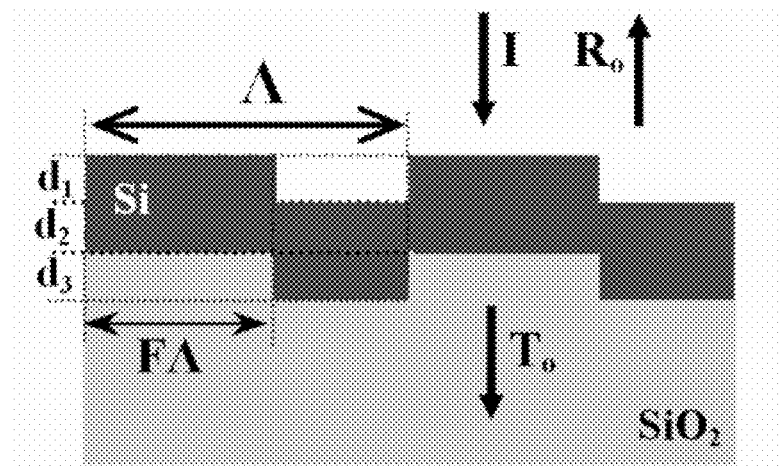
FIG. 14A is a schematic illustration of a three-level nonpolarizing beamsplitter designed for normal incidence.
Figure 14B:
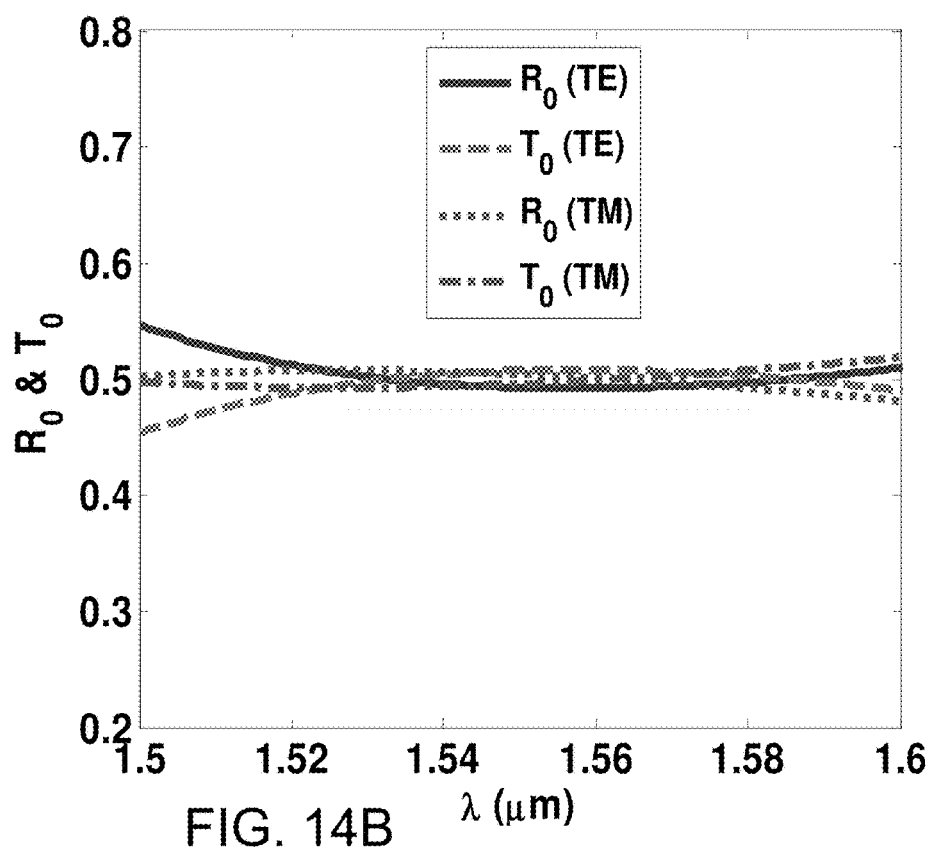
FIG. 14B shows reflectance and transmittance of the element shown in FIG. 14A.
Figure 14C:
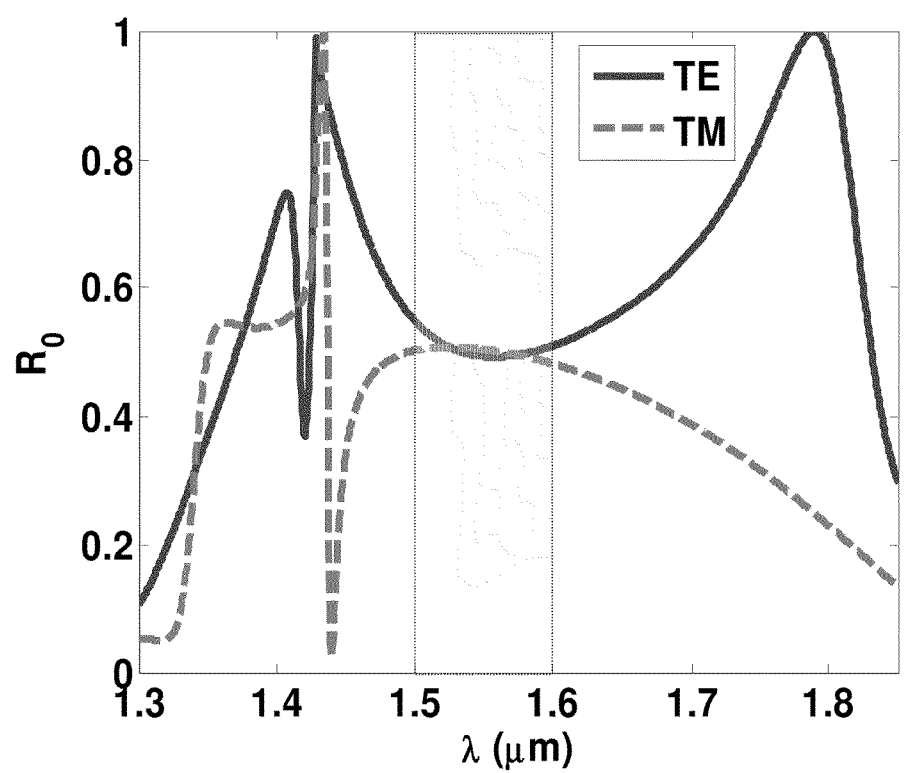
FIG. 14C shows a spectral view of the reflectance response of the element shown in FIG. 14A.
Figure 14D:
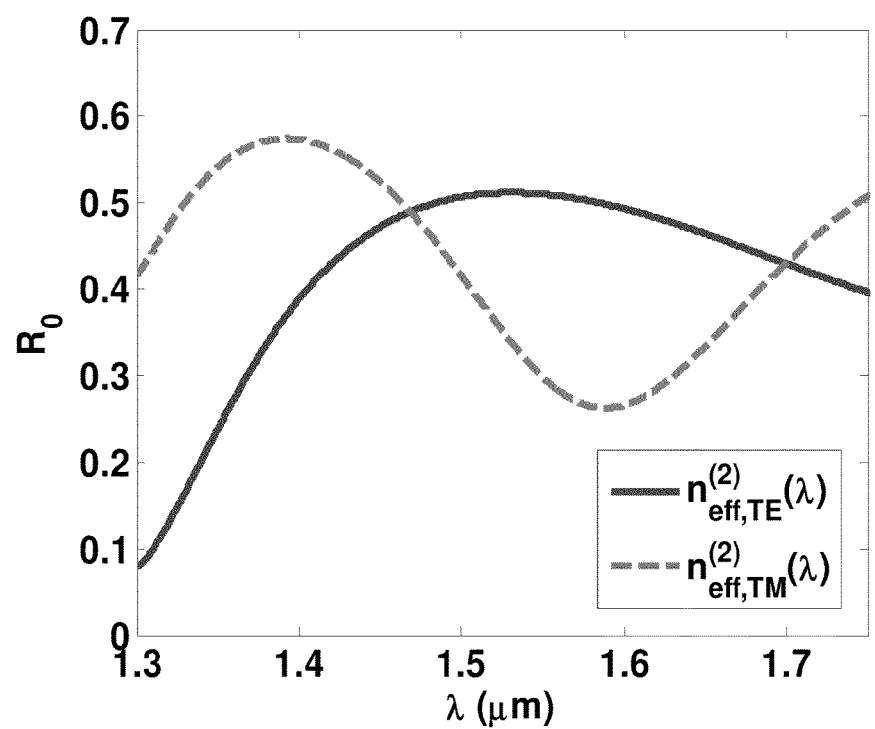
FIG. 14D shows the reflectance of the three-layer EMT thin-film approximation of the periodic element shown in FIG. 14A. The layers' second-order effective refractive indices are used for TE and TM polarizations.

FIGS. 14A-14D demonstrate the application of three-level leaky-mode structures to design yet another optical nonpolarizing beamsplitter. FIG. 14A shows a multilevel leaky-mode resonant device designed as a 50/50 nonpolarizing beam splitter under normal incidence, and FIG. 14B shows the reflection and transmission response of the device. This element is designed to provide good beam-splitting functionality in the 1500-1600 nm band. This PSO-designed three-level element has parameters $\Lambda$=964 nm, F=0.8869, $d_1$=259.2 nm, $d_2$=105.7 nm, and $d_3$=259.2 nm. The spectral response of this element across a wide band is displayed in FIG. 14C. Again, to compare the response of this element with its approximate three-layer homogeneous thin-film counterpart, we computed the second-order EMT refractive indices of the layers. FIG. 14D shows the reflectance of the approximate thin-film element, where two graphs are drawn for two sets of second-order refractive indices for TE and TM polarization states of incident light.

Example 13

Figure 15A:
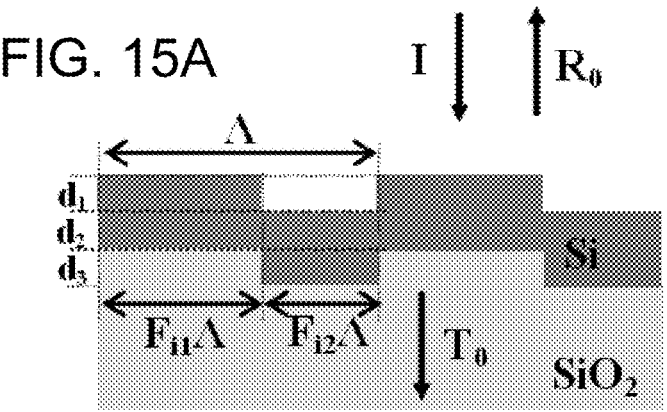
FIG. 15A is a schematic illustration of a three-level reflector designed for normal incidence.
Figure 15B:
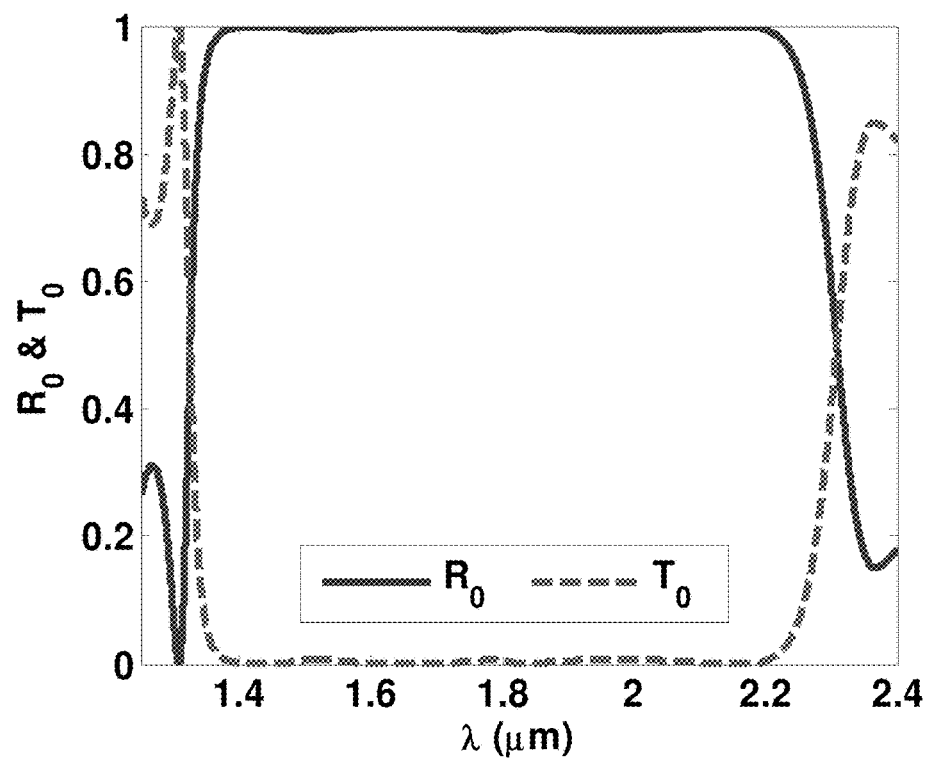
FIGS. 15B and 15C show the zero-order reflectance ($R_0$) and transmittance ($T_0$) spectra of the reflector shown in FIG. 15A on linear and logarithmic scales, respectively. The higher refractive index material is silicon that conforms to an underlying silica relief structure as shown in FIG. 15A.
Figure 15C:
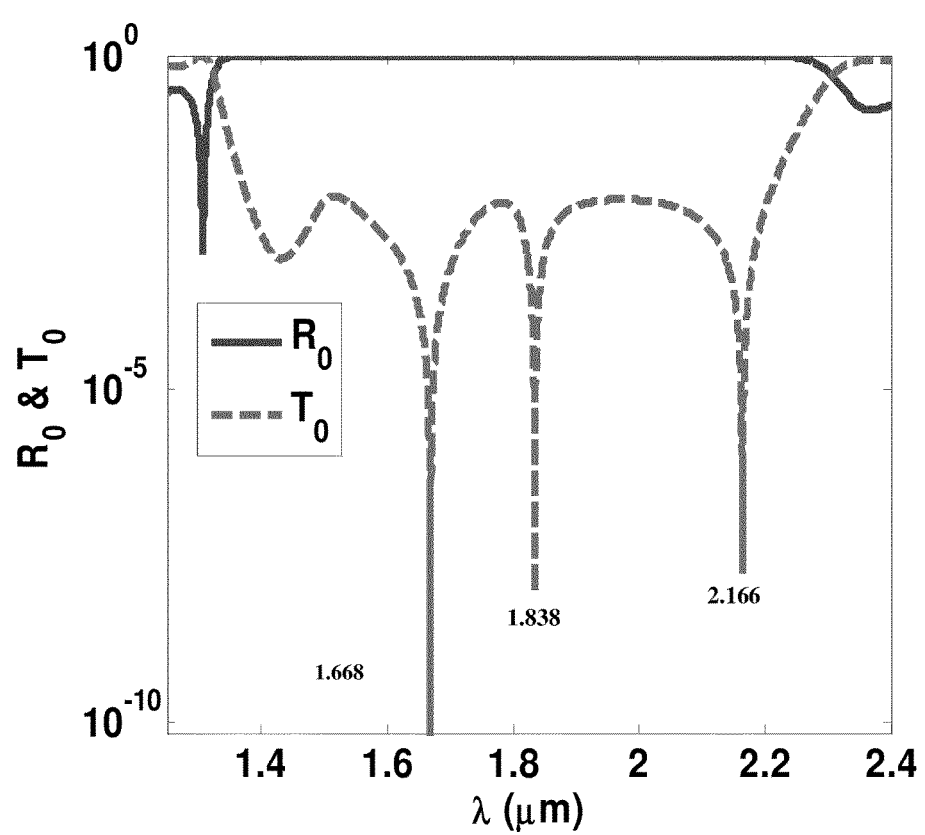

Referring to FIGS. 15A, 15B, and 15C, respectively, a reflector and its reflection and transmission response in the 1.3-2.3 µm spectral band (which responses are computed, as are all the responses described in this disclosure) is shown on linear and logarithmic scales. To design the element shown schematically in FIG. 15A, the incidence and substrate media were assumed to be air ($n_{inc}$=1.0) and silica ($n_{sub}$=1.48). The refractive index of silicon (Si) was taken to be 3.48. The device is designed to be illuminated normally ($\theta$=0) with TE-polarized light (electric field vector perpendicular to the plane of incidence). The PSO-designed reflector has an effective three-level structure, as shown in FIG. 15A, with a rectangular spatial profile, where the period, thickness of each layer, and fill factors ($\Lambda$, $d_i$, $F_{ij}$) are the optimization parameters that we found with the PSO algorithm. The first (topmost) and the last (bottom) layers were rendered by the algorithm as periodic layers, whereas the middle layer was rendered as a homogeneous (non-periodic) layer ($F_{21}$=1.0). The basic period and fill factors of this reflector were found to be $\Lambda$=846.4 nm and $F_{11}$=$F_{31}$=0.283 (two-part period). In addition, the thicknesses of the layers from the top to the bottom were determined to be $d_1$=375 nm, $d_2$=175 nm, and $d_3$=375 nm. The top layer was designed as a silicon/air grating and the bottom layer as a silica/silicon grating. The middle homogenous layer was designed to be made of silicon. The reflection bandwidth of this broadband reflector, maintaining a reflectance exceeding 0.99, is 839 nm. FIG. 15C displays the corresponding reflectance and transmittance spectra on a logarithmic scale. The dips in the transmittance spectrum evidence the presence of leaky-mode resonances on which the design of this device is based. By examining the electric field distribution inside the device and in the surrounding media at each of the three resonance wavelengths denoted in FIG. 15C, the leaky modes were found to localize in the top and bottom grating layers.

Figure 15D:
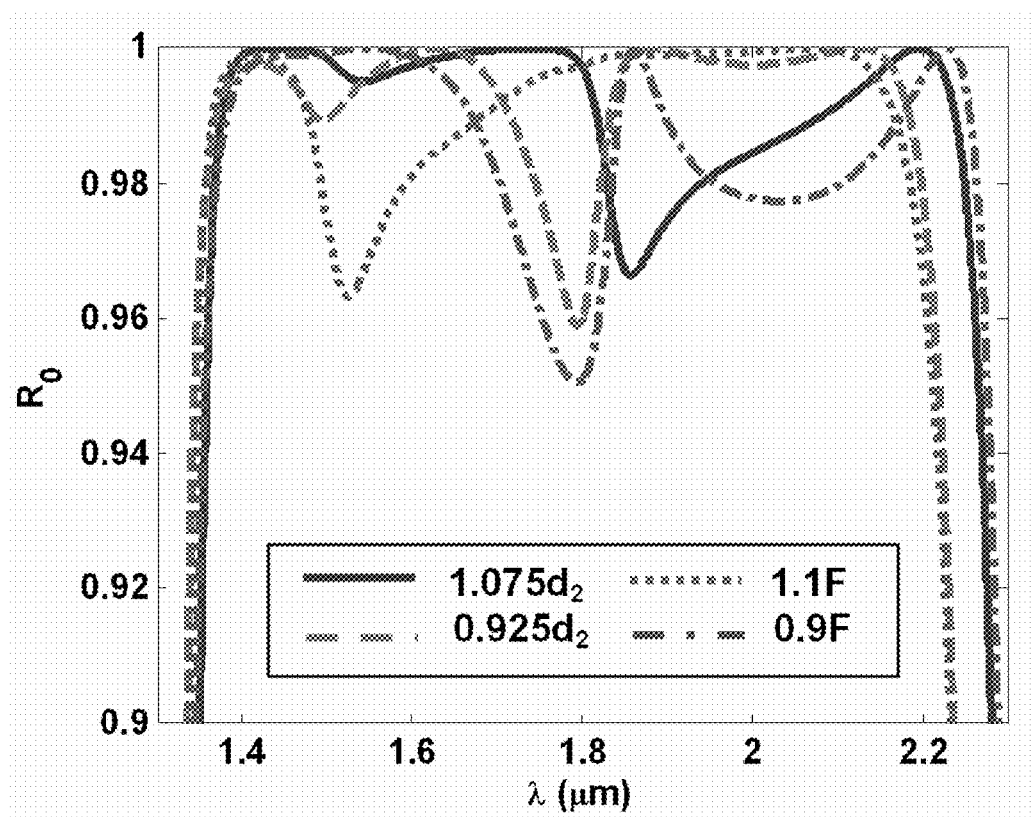
FIG. 15D shows the reflectance spectra of the reflector shown in FIG. 15A versus ±7.5% and ±10% variations in $d_2$ and F.

As discussed in more detail below, fabrication of these devices can be accomplished by deposition of a high-index medium on an appropriate surface-relief pattern etched into the substrate. We conducted a prefabrication and manufacturability analysis of the performance of the device shown in FIG. 15A relative to deviations in its structural parameters. FIG. 15D shows reflectance spectra of that design computed for representative deviations in silicon thickness ($d_2$) and grating fill factor (F=$F_{11}$=$F_{31}$). As FIG. 15D shows, this particular device is designed to yield reflectance $R_0$>0.95 under ±7.5% and ±10% deviations in $d_2$ and F, respectively.

Example 14

Figure 16A:
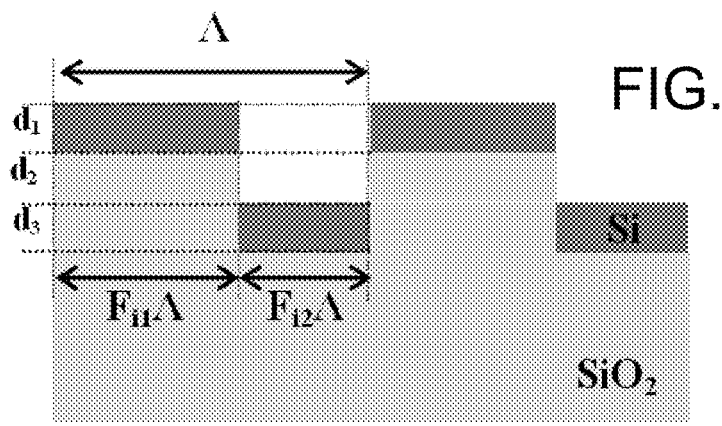
FIG. 16A is a schematic illustration of another three-level reflector designed for normal incidence.
Figure 16B:
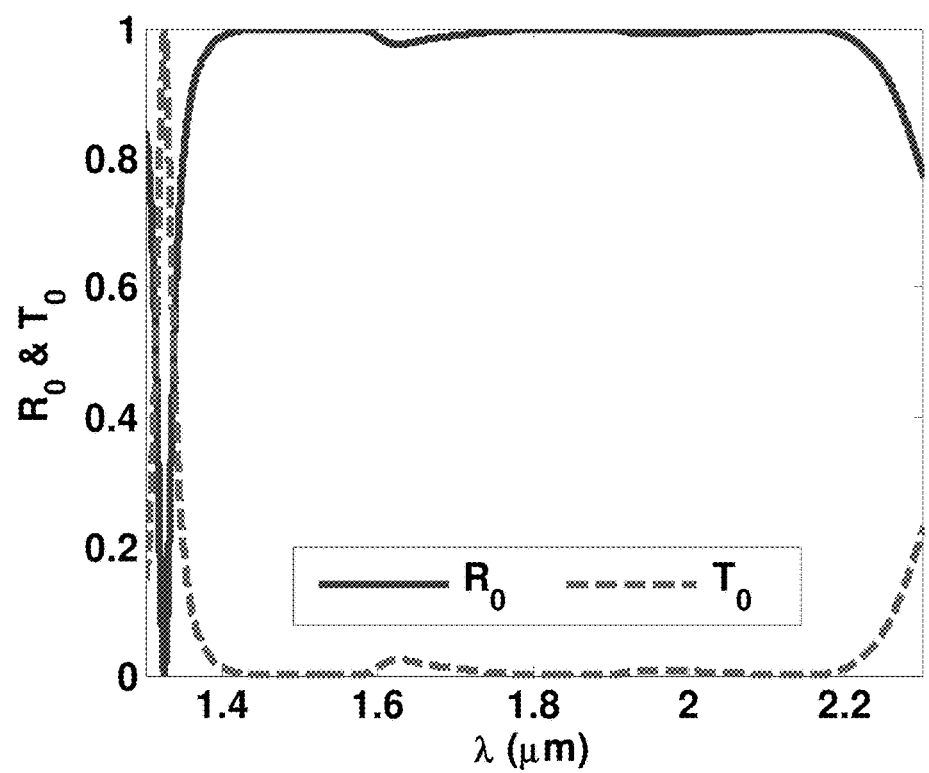
FIG. 16B shows on a linear scale the reflectance and transmittance spectra of the reflector shown in FIG. 16A.

FIG. 16A shows a schematic of a broadband, three-level silicon-based reflector, designed by PSO for TM polarization (magnetic field vector perpendicular to the plane of incidence). The reflectance and transmittance of this element are shown in FIG. 16B. As depicted in FIG. 16A, this reflector differs from that in FIG. 15A. The optimized parameters of this element were determined as $\Lambda$=882.4 nm, $F_{11}$=$F_{21}$=$F_{31}$=0.417, $d_1$=572 nm, $d_2$=455 nm, and $d_3$=572 nm. The bandwidth of this reflector is 835 nm for $R_0$>0.975 in the 1.3-2.3 µm range.

Example 15

Figure 17:
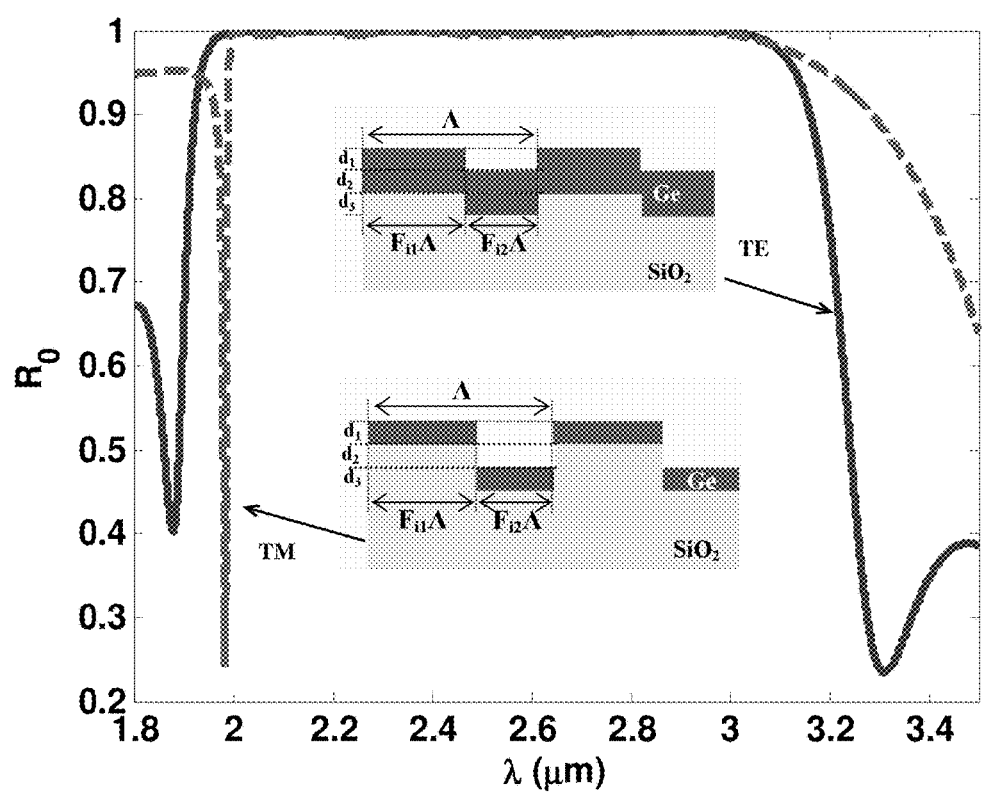
FIG. 17 shows reflectance spectra of broadband reflectors designed with Ge/SiO$_2$ for TE and TM polarizations.

The use of higher refractive index materials like germanium ($n_{Ge}$=4.0) in the mid-IR band (particularly here 1.8-3.2 µm) will increase the bandwidth of these reflectors. The higher refractive index of germanium raises the refractive index contrast in the grating regions. This broadens the resonances and enhances their interaction and overlap. FIG. 17 shows the spectral response of Ge-based reflectors designed for TE and TM polarizations and the associated reflector design. The parameters delivered by the PSO algorithm for the reflector in TE polarization are $\Lambda$=1080.3 nm, $F_{11}$=$F_{31}$=0.253, $F_{21}$=1.0, $d_1$=533 nm, $d_2$=126 nm, and $d_3$=533 nm. The bandwidth of this reflector is 1097 nm, across which $R_0$>0.99 in the 1.8-3.2 µm range. Silica ($SiO_2$) has a refractive index of ~1.42 in this band. The parameters of the TM reflector are $\Lambda$=1077.5 nm, $F_{11}$=$F_{21}$=$F_{31}$=0.744, $d_1$=565 nm, $d_2$=875 nm, and $d_3$=565 nm. The bandwidth of this reflector, which is designed to maintain a reflectance exceeding 0.99, is 1050 nm.

Fabrication

The present leaky-mode resonance elements may be fabricated using a variety of methods and materials. Device patterning may be conducted with conventional photolithography, nanoimprint lithography, electron-beam lithography, and laser holographic interference lithography. Standard etching and thin-film deposition processes are applicable in the fabrication steps. Etching and pattern transfer may be performed using reactive-ion etching RIE (for shallow gratings) and deep RIE (DRIE; for deep gratings). Inspection by scanning electron microscope (SEM) and atomic force microscope (AFM) may be used for assessing of the processed devices. Optical spectral characterization can be done with tunable lasers, wide-band supercontinuum sources, and matched spectrum analyzers. Fast pulse lasers, wide-bandwidth oscilloscopes, and sensitive detectors may be used for testing the devices.

Other possible fabrication methods include low-pressure chemical vapor deposition (LPCVD) in a tube furnace, which may provide a conformal silicon layer with low loss and a high refractive index; sputter deposition (though a sputtering system from AJA International, Inc. (North Scituate, Mass.) operated at a base pressure of $1.9\times10^{-7}$ torr and a deposition rate of 2.7 nm/min did not produce the desired device in a test run); electron-beam evaporation (though an e-beam evaporation system from CHA Industries (Freemont, Calif.) operated at a base pressure of $3.0 \times 10^{-6}$ torr and a deposition rate of 50 nm/min in one test run and, in another test run, at a base pressure of $8.0 \times 10^{-8}$ torr, a process pressure of $1.5 \times 10^{-7}$ torr, and a deposition rate of 10 nm/min did not produce the desired device); and using a honeycomb mesh (e.g., made of stainless steel and having a cell diameter of 6.35 mm, a mesh height of 6-10 mm, and a material thickness of 0.1 mm) to collimate an atomic beam, applied using e-beam deposition techniques, to sufficiently structure the deposited materials.

The number of fabrication steps will depend on the level of pattern complexity, as those of ordinary skill in the art will understand from FIG. 1. Some devices will be simple to process. For example, the device in FIG. 2A, and other similar elements, may be fabricated by first patterning a substrate, in this case made of $SiO_2$, beginning with spinning a resist layer upon the substrate, patterning it in 1D or 2D format by e-beam lithography or by laser interference lithography, developing the resist, and using it as a mask for RIE etching into the substrate to create a corresponding pattern in the $SiO_2$ medium. Subsequently, depositing a conformal layer of Si onto the relief pattern by e-beam evaporation or sputtering, for example, will complete the fabrication. Inspection by SEM and AFM may be used for verification of the features such as fill factors and layer thicknesses of the processed devices. Verification of the spectral response may be done with tunable lasers, wide band supercontinuum sources, and matched spectrum analyzers.

All of the present optical elements, including the microwave elements, can be made and used without undue experimentation in light of the present disclosure. While the present devices and methods have been described in terms of preferred embodiments, it will be apparent to those of skill in the art that variations may be applied to these devices and methods without departing from the scope of the claims. For example, while the present devices have been described as reflectors, beamsplitters, and polarizers, other configurations for the devices are possible, including bandstop filters, laser minors, polarization control elements, any one or more of which may be used in laser technology, communication systems, and medical systems, to name a few.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. An optical element comprising:
   a substrate; and
   a plurality of spatially modulated periodic layers coupled to the substrate, wherein the plurality of spatially modulated periodic layers are configured to produce leaky mode resonance in response to an incident electromagnetic wave;
   where the leaky mode resonance induces a substantially constant reflectance or transmittance over a bandwidth greater than 600 nanometers.

2. The optical element of claim 1, further comprising:
   a physical cover medium overlying the plurality of spatially modulated periodic layers.

3. The optical element of claim 1, further comprising:
   a homogeneous layer coupled to the plurality of spatially modulated periodic layers.

4. The optical element of claim 3, where the substrate comprises silica; a spatially modulated periodic layer among the plurality of spatially modulated periodic layers that is in contact with the substrate comprises silicon and silica; and the homogeneous layer comprises silicon.

5. The optical element of claim 1, where at least one of the spatially modulated periodic layers comprises silicon.

6. The optical element of claim 1, where at least one of the spatially modulated periodic layers comprises germanium.

7. The optical element of claim 1, where a first spatially modulated periodic layer among the plurality of spatially modulated periodic layers is modulated in a first dimension.

8. The optical element of claim 7, where the first spatially modulated periodic layer comprises a first material having a first index of refraction and a second material having a second index of refraction.

9. The optical element of claim 8, where in one period of the first spatially modulated periodic layer:
   the first material has a first length in the first dimension;
   and the second material has a second length in the first dimension; and
   the first length is greater than the second length.

10. The optical element of claim 8, where the first spatially modulated periodic layer is modulated in a second dimension.

* * * * *